(12) United States Patent
Bar-Shalom et al.

(10) Patent No.: US 10,492,165 B2
(45) Date of Patent: Nov. 26, 2019

(54) ENHANCED COLLABORATING TIMING MEASUREMENTS FOR WIRELESS COMMUNICATIONS

(71) Applicant: Intel IP Corporation, Santa Clara, CA (US)

(72) Inventors: Ofer Bar-Shalom, Kiryat Ono (IL); Yuval Amizur, Kfar-Saba (IL); Leor Banin, Petach Tikva (IL); Nir Dvorecki, Herzeliya (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/184,775

(22) Filed: Nov. 8, 2018

(65) Prior Publication Data
US 2019/0075538 A1 Mar. 7, 2019

Related U.S. Application Data

(60) Provisional application No. 62/584,022, filed on Nov. 9, 2017.

(51) Int. Cl.
*H04W 4/00* (2018.01)
*H04W 64/00* (2009.01)

(52) U.S. Cl.
CPC .................................. *H04W 64/00* (2013.01)

(58) Field of Classification Search
CPC .... H04W 4/029; H04W 64/00; H04W 64/003
See application file for complete search history.

(56) References Cited

U.S. PATENT DOCUMENTS

2018/0310133 A1* 10/2018 Ramasamy ........... H04W 4/025
2019/0069267 A1*  2/2019 Seok ..................... G01S 5/0284

* cited by examiner

*Primary Examiner* — Omoniyi Obayanju
(74) *Attorney, Agent, or Firm* — Eversheds Sutherland (US) LLP

(57) ABSTRACT

This disclosure describes methods, apparatus, and systems related to enhanced collaborative time of arrival operations for wireless communications. A device may send trigger frames and may receive one or more null data packets (NDPs) from respective anchor station devices at respective times. The device may send a first null data packet announcement (NDPA) indicating the respective times. The device may send a third NDP. The device may identify one or more uplink NDPAs received from the respective anchor station devices, the one or more uplink NDPAs indicating respective times of arrival of the NDPs at the respective anchor station devices. The device may send a location measurement report (LMR) protocol data unit (PDU).

20 Claims, 9 Drawing Sheets

US 10,492,165 B2

ENHANCED COLLABORATING TIMING MEASUREMENTS FOR WIRELESS COMMUNICATIONS

CROSS-REFERENCE TO RELATED APPLICATIONS

This application claims the benefit of U.S. Provisional Application No. 62/584,022, filed Nov. 9, 2017, the disclosure of which is incorporated by reference as if set forth in full.

TECHNICAL FIELD

This disclosure generally relates to systems and methods for wireless communications and, more particularly, to enhanced collaborating timing measurements.

BACKGROUND

Wireless devices are becoming widely prevalent and are increasingly requesting access to wireless channels. Wireless communication devices may determine device locations in wireless channels.

DETAILED DESCRIPTION

Figure 1:
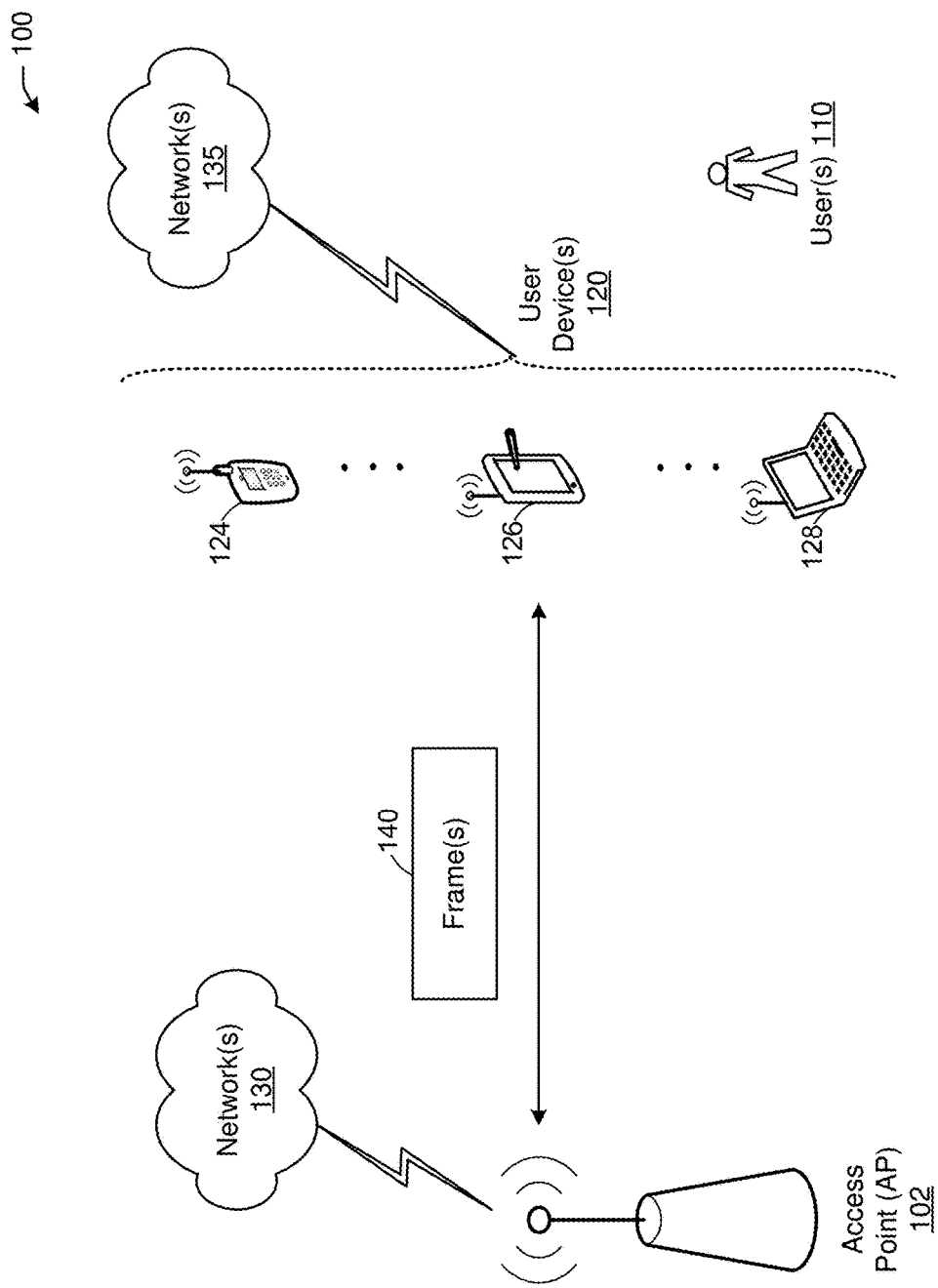
FIG. 1 depicts a network diagram illustrating an example network environment, according to one or more example embodiments of the disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Wireless devices may determine their respective locations using a variety of methods. One of such methods is known as collaborative time of arrival (CToA). CToA is an indoor geolocation method which may enable scalability of geolocation systems defined in the IEEE 802.11 family of standards, in particular, fine timing measurement (FTM) capabilities of wireless devices.

FTM is a point-to-point, single-user protocol which may include an exchange of one or more messages between station devices (STAs) to determine a client device's location. An initiator STA may seek to measure its range relative to a responder STA. For example, one FTM responder and one FTM receiver can establish a connection to each other and exchange a few messages to establish timing measurements that could be translated into a range measurement between the FTM responder and the FTM receiver. This process also has to be repeated with other FTM responders.

Because FTM is a point-to-point, single-user protocol, however, FTM operations may be enhanced by CToA in scenarios where there may be many user devices simultaneously requesting positioning services. In such environments (e.g., stadiums, arenas, crowded cities, etc.), the likelihood of packet collisions increases with more devices, thereby undermining the ability of devices to perform positioning services. To service high volumes of device positioning services, CToA may be used. A CToA system differs from an FTM system because it may use fewer frame exchanges, and there may be fewer time constraints than in some FTM systems.

CToA may have several modes: (1) a client-mode which may enable global positioning services-like operations in an indoor environment, and which may allow an unlimited number of client devices to estimate their respective positions without exposing their respective presence to a network (e.g., private estimation of position); and (2) a network-mode which may facilitate large-scale applications with many client devices, and may enable a central positioning server to estimate the positions of nearby wireless devices.

In client-mode, an unlimited number of client devices may estimate their locations while maintaining their privacy. CToA client stations (cSTAs) only listen to bSTA broadcasts (e.g., broadcasts of known bSTAs associated with an access point). Once a cSTA receives a broadcast, the cSTA may measure a time of arrival of the broadcast at the cSTA and may and combines the time of arrival with other time of arrival and time of departure data logged by the cSTA and published by bSTAs in CToA beacons to determine cSTA position. Because client STAs (cSTAs) may not transmit, their presence may not exposed and their privacy may be maintained.

In network-mode, a network administrator simultaneously may track the position of many client devices. CToA client devices operating in network-mode may not listen for CToA beacons, but only may transmit CToA beacons to enable a network administrator to track device position.

CToA operations may include the use of unmanaged and unsynchronized CToA broadcast stations (bSTAs). The bSTAs, which may be in known locations, periodically may broadcast beacons indicating the respective time of departure of each beacon. Neighbor bSTAs and other client devices which receive a beacon may log the time of arrival of the beacon. Any bSTA may publish its most recently logged time of arrival in a subsequent beacon. CToA client devices may receive beacons from other devices and may combine the time of arrival data from those beacons (e.g., times of arrival at other devices) with the times of arrival at a given client device. Using the aggregated time of arrival data from multiple devices, a device may estimate its own location. In a network-mode, client devices may send time of arrival data to a central positioning server, which may aggregate time of arrival data from multiple devices and may estimate the location of the multiple devices.

A CToA beacon may associated with a unique packet identification index (PID), which may be assigned by the broadcasting device. The PID is typically implemented as a running counter, and is independently maintained by any bSTA. A CToA beacon may include a time of departure time-stamp (e.g., measured by the broadcasting device), and multiple time of arrival measurements, which may be associated with the same PID. The PID enables CToA client devices (e.g., operating in "client-mode"), or a positioning server (e.g., in "network-mode") to associate between the time of departure and corresponding time of arrival measurements collected either by the client device itself or by different bSTAs.

In addition to a time of departure, some of the CToA beacons broadcast by bSTAs also may include a data log of timing measurements collected by a bSTA during the past x-seconds. This data log may be referred to as "CToA location measurement report" (CLMR). The timing measurements included in the CLMR reports may be used by a cSTA, which may combine the data with its own time of arrival measurements to estimate the cSTA's position. Although the CLMR logs are maintained by each of the bSTAs independently, the protocol also enables the CLMR logs broadcast by one bSTA to be aggregated by its neighbors, thereby providing an immunity mechanism against "hidden nodes" in a wireless network.

CToA uses the principles of the channel sounding mechanism defined by the IEEE 802.11ac standard. The channel sounding protocol originally proposed for determining optimal beamforming weights at a transmitter side, relies on a transmission of a null-data packet (NDP), which may include only a known sequence of orthogonal frequency-division multiplexing (OFDM) symbols, but with no data payload. The transmission of a NDP may be preceded by a NDP announcement (NDPA), which may inform receivers of a coming NDP frame. The NDPA may include information for a receiver to estimating a channel response.

A CToA network also may be unmanaged in that no coordination or scheduling protocol between the bSTAs (or the receiving clients) may be needed for its operation. Ideally, if the bSTAs are implemented as dedicated units, a CToA network may be allocated with a unique operation channel (e.g., with bandwidth of 20 MHz, 40 MHz or 80 MHz, depending on the spectrum band in which the system operates). Any bSTA may scan a spectrum to detect prior CToA broadcast activity, and once detected, the bSTA may contend for access of a channel to broadcast its beacons, and may listen to broadcasts of neighbor devices during a remaining time.

A more challenging situation may occur when bSTA functionality is implemented as part of a Wi-Fi standard communication. In such a situation, an access point (AP) may need to provide data transaction services to associated STAs. An AP/bSTA periodically may scan a spectrum to detect CToA broadcast activity. After receiving scan results, the AP/bSTA may announce an "unavailability window" to associated STAs. During the unavailability window, the AP/bSTA may "hop" to other native channels of neighbor APs/bSTAs. In each channel, the AP/bSTA may broadcast a short CToA beacon, which may include time of departure, but not a CLMR. When the AP/bSTA returns to its native channel, the AP/bSTA may broadcast a longer CToA beacon which may include both a time of departure and a recent CLMR. By scanning a medium, CToA client devices may detect CToA activity and estimate a broadcast periodicity of the bSTAs. Once the cSTA determines broadcast periodicity, the cSTA may hop between native channels used by the APs/bSTAs and may and collect CLMRs broadcast on the channels.

In large-scale venues including, but not limited to, stadiums, airport terminals, train stations, shopping malls, and "smart cities," venues may be classified as either intra-access point or inter-access point. A user navigating a venue may move between intra-access point and inter-access point coverage areas.

Intra-access point venues may include a cluster of Wi-Fi (e.g., fixed or mobile) devices, most of which may be at known locations that may be either associated or unassociated in close vicinity to a single AP. Such devices may include Wi-Fi enabled surveillance cameras, printers, wireless smart thermostats, smart television displays, and other devices. Such devices may be in a single communication channel (e.g., a communication channel occupied by an AP in the vicinity of the devices).

Inter-access point venues may support data services for a large number of users. Large-scale venues may be covered by a large number of APs, where each AP may operate in a different frequency channel.

Some embodiments using CToA techniques may have scalable location requirements in both AP-dense and AP-sparse environments. Also, some CTOA techniques may lack a combination of both managed and unmanaged scalable location protocols that may enable support of multiple use cases such as user navigation, asset tracking, analytics, and others.

In CToA, a network may not be synchronized and broadcasts may not all be received at the same time. Therefore, bSTAs may contribute clock offsets and drift which may need to be estimated and accounted for. While one bSTA clock offset is being measured, other bSTA clock offsets may continue to drift apart. The clock offsets and drift may result in significant inaccuracies in ranging/positioning calculations. CToA calculations therefore may improve by accounting for clock offsets and drift. In addition, in a trigger-based IEEE 802.11ax scheme with a compressed time schedule, independent APs/bSTAs may broadcast independently, resulting in possible collisions and inability to process messages used for CToA calculations, for example. Such problems may result in difficulties for client devices roaming in and out of inter-AP (e.g., a single AP with multiple associated devices) and intra-AP (e.g., multiple APs operating on different frequency channels) environments. Also, in IEEE 802.11ax multi-user communications, a device may not be listening to a connection between other devices and may not receive and decode packets sent between those devices, which may limit a device's ability to collect data useful for CToA calculations.

To allow CToA to operate effectively in an IEEE 802.11ax environment, CToA may be enhanced by allowing an AP to control associated devices to perform CToA operations. In particular, CToA may be enhanced for trigger-based operations with compressed transmission opportunity (TXOP) time and with AP controlling operations.

Example embodiments described herein provide certain methods, devices, and systems for enhanced collaborating timing measurements for wireless communications.

In one or more embodiments, enhanced CToA measurements may enable a combination of both managed and unmanaged scalable location protocols to enable the support of multiple use cases such as user navigation, asset tracking, analytics, and others. Client devices may enter and exit inter-AP and intra-AP environments managed by APs, and may benefit from receiving CToA data determined based on trigger-based uplink (UL) responses of devices associated with APs. By leveraging CToA data from different inter-AP and intra-AP environments, client devices may be able to estimate their positions as they move around venues where many client devices may be active.

In one or more embodiments, the enhanced collaborating timing measurements may assume that a venue consists of many clusters of Wi-Fi enabled anchor stations (AS) that may be managed by a single AP. Each cluster may operate in a different communication channel, and users may move in and out of the clusters. In a cluster, AS devices may respond to trigger frames sent by an AP in a channel, and a client device may listen to and identify entire transactions between the AP and any AS in a cluster, and may identify a downlink (DL) NDP and a location measurement report (LMR) sent by the AP to collect time of arrival and time of departure data useful in determining a device's position.

In one or more embodiments, an enhanced CToA operation may use an IEEE 802.11 high efficiency (HE) multi-user (MU) (e.g., HEz-MU) ranging message sequence. The entire ranging transaction may occur during a single TXOP, beginning with a trigger frame sent by an AP. A trigger frame may trigger an AS device to broadcast a UL frame (e.g., a NDP or other type of frame) a time after the trigger frame (e.g., short inter frame space of 16 us or another time). UL frames sent by AS devices may be received by an AP, and the AP may measure the respective times of arrival of any received UL frame. After receiving any number of UL transmissions (e.g., a UL transmission from each triggered AS device), the AP may send a DL frame (e.g., a NDPA) indicating the measured times of arrival for any UL transmissions of the AS devices. After another time (e.g., short inter frame space of 16 us or another time), the AP may send another DL frame (e.g., a NDP), and any AS device or other client device listening may receive the DL frame and measure its time of arrival.

In one or more embodiments, to enable AS devices to upload and/or broadcast respective location measurement reports (LMRs) there may several options: (1) Assume that all AS devices upload their LMRs to the AP using a respective HE-MU orthogonal frequency division multiple access (OFDMA) multiplexing frame (e.g., using diversity such as frequency, spatial, code division, etc.). A time (e.g., short inter frame space of 16 us or another time) after the HE-MU OFDMA multiplexing frame is received, the AP broadcasts an LMR protocol data unit (PDU) which aggregates all the AS LMRs+PPM (parts per million) clock offset estimates for each AS device (e.g., based on the received UL transmissions of the AS devices). The reason that the AP may broadcast the aggregated results is that the AS uplink transmission may be MU multiplexed, and therefore may be optimized for an instantaneous channel observed between the AP and a specific AS device. Because it may not be ensured that all client devices or other AS devices may receive a particular AS transmission, the AP may aggregate the LMRs from any AS devices and may send them in a broadcast, thereby increasing the probability of reception by all client devices listening to the transaction. (2) Assume that the AS devices broadcast their respective LMRs in a data PDU frame. The data PDU broadcast may be decoded by the AP and any client listening to the channel. If a client device can identify time of arrival and departure data from devices engaged in a trigger-based CToA operation, then client devices may move in and out of different networks in crowded environments while still being able to estimate device position using CToA.

In one or more embodiments, AS devices may send UL NDPAs in multiple input, multiple output (MIMO) fashion (e.g., using different respective frequencies allocated to respective associated devices), so any device not listening to a connection between the AP and another device may not receive a respective UL NDPA sent by a device in a cluster. Therefore, the AP may collect UL NDPA data (e.g., time of arrival and time of departure data) from associated devices and may send a DL LMR to the associated devices to provide respective device time of arrival and departure data.

In one or more embodiments, AS devices may send UL protocol data units (PDUs) (e.g., UL LMR PDUs) with time of arrival and departure data collected by the respective AS devices associated with an AP in a cluster. Because the AS devices may send the PDUs at different times in a broadcast mode, the other AS devices in a cluster, along with a nearby client device, may identify the PDUs and collect their respective timing information.

In one or more embodiments, because enhanced CToA may correct clock error and drift of AS devices, the CToA data may be more accurate. The length of a transmission opportunity (TXOP) may extend to ~1 ms. A crystal oscillator with ±1 PPM (parts per million) accuracy, may accumulate a clock offset error of ±1 ns (equivalent to ~±0.3 m ranging error) or ±25 ns (±8 m) for a typical 25 PPM crystal oscillator. Thus, a PPM offset estimated during a TXOP between an AS device and AP may be announced and/or corrected by one only of the sides (e.g., AP or AS). The enhanced CToA protocol may support several options: (1) The AP estimates the PPM offset of each AS and broadcasts the results in a PDU data frame after receiving respective UL frames including the AS LMRs to the AP. (2) Each AS estimates the PPM offset relative to the AP and broadcasts the results in its PDU data frame broadcast. The AP then aggregates the reports from all the AS, and sends out their estimated PPM offsets in a data PDU. (3) Each AS estimates the PPM offset relative to the AP and broadcasts the results in its PDU data frame broadcast. In this case, the optional AP LMR PDU at the end of the AS LMR broadcasts may not be needed. (4) The AP estimates the PPM offset of each AS and broadcasts the results in a dedicated PDU that follows the AS LMR broadcasts.

In one or more embodiments, the AP, or an AS device may report the clock PPM offsets of other devices. An information element indicating PPM offsets may include an indication of a medium access control (MAC) address of the managing AP (e.g., 48 bits), an indication of a MAC address of the AS device associated with the clock offset (e.g., 48 bits), the clock PPM offset measure (e.g., with an accuracy of 0.01 PPM or better, 32 bits), and a bit indicating which side estimated the offset (e.g., 0 for an AP, 1 for an AS, 1 bit).

In one or more embodiments, within a cluster, an unlimited number of users may benefit from a managed nature of a cluster to estimate user locations while minimizing power consumption. In between clusters, a user may continue to navigate a venue with the help of a CToA protocol that may support an unmanaged multi-channel operation. Because client devices may move through both managed and unmanaged environments, enhanced CToA may allow client devices to leverage managed cluster environments controlled by APs by listening for and receiving time of arrival and departure data which client devices may use to estimate device positioning even while moving between different locations and types of environments.

In one or more embodiments, a trigger frame sent by an AP may direct individual devices (e.g., AS devices) to send an uplink frame (e.g., a NDP). To trigger UL transmissions from multiple devices, an AP may send individual trigger frames (e.g., one per device with an AP resource allocation). When an AS device identifies a trigger frame addressed to the AS device, other AS devices and/or passive client devices may listen for and identify a UL NDP (or other UL transmission) sent by the triggered AS device, and any listening device may measure the time of arrival of the UL transmission.

In one or more embodiments, UL LMRs may be sent using MU frequency division multiplexing (FDM) or may be sent sequentially using time division multiplexing (TDM). In the MU case, a channel may be subdivided between AS devices according to an AP-provided allocation (e.g., which may occur prior to the CToA sequence, meaning prior to the trigger frame used to trigger a UL transmission for CToA). Passive client devices listening to this part of the sequence may be unable to decode a triggered LMR sent by an AS device because the MU resource allocation for the sending AS device may be unknown to them, along with channel state information between the AP and the individual transmitting AS device. Thus, the AP in that case may decode and repack the UL LMR and broadcast the LMR data at the end of the sequence (e.g., along with clock correction information). A broadcast (e.g., the DL LMR) may be executed at the lowest modulation and coding scheme (MCS) to enable a wide range of STA types to decode the broadcast. In the TDM case, any AS device may receive an allocation of a timeslot from an AP, and may use the timeslot to send an LMR. A cluster of devices may be formed statically by associated an AP with AS devices nearby. The device association phase may occur according to the IEEE 802.11 standards, and may be followed by a resource allocation/negotiation phase which may result in time, frequency, and/or other resources allocated to AS devices by an associated AP.

In one or more embodiments, the number of AS devices participating in an enhanced CToA sequence, the AS device identifiers (IDs), and the resources allocated to any AS device may be negotiated beforehand (e.g., preceding a trigger frame sent to trigger a UL transmission used for CToA). Such information may be assumed to be available to the passive client devices (e.g., through the broadcast of a dedicated information element at the beginning of each sequence, or periodically. For example, such broadcast may include other useful information elements such as a location configuration information element, which may provide passive clients with the coordinates of AS devices and the associated AP, along with other necessary parameters. Given that information, the passive client may be able to predict the timing of each frame sent during the enhanced CToA sequence, and in particular, the timing of the frames conveying the LMR PPDU.

In one or more embodiments, a device may log time of arrival and departure information of transmissions based on their transmission and receipt times. For example, a client device may log a transmitter AS identifier, a transmitter medium access control (MAC) address, a time of departure of a transmission, a receiver AS identifier, a receiver MAC address, and a time of arrival of a transmission. For a transmitted packet, the transmitter AS identifier, the packet time of departure, and the transmitter MAC address may be logged by the transmitting device. For a received packet, a packet identifier (PID), a time of arrival of the packet, a transmitter MAC, and transmitter AS identifier, a receiver MAC address, and a receiver AS identifier may be logged by a device receiving a packet.

In one or more embodiments, a user on the move in between clusters may receive location services through the enhanced CToA scheme. The enhanced CToA scheme enables an unmanaged operation of an-AP/CToA bSTA-based network. Any AP/bSTA may announce an unavailability to its associated or unassociated STAs in a basic service set (BSS) (e.g., by issuing a "CTS-to-Self" frame or another type of frame). During the unavailability period, the AP/bSTA may "hop" through a list of channels in which neighbor bSTA/APs operate. Such a list of channels may be obtained through an AP scanning process. On any channel, the bSTA/AP may broadcast a CToA beacon, which may include an NDPA frame containing an information element with any previous timing measurements (e.g., times of arrival of broadcasts sent by other bSTAs, and times of departure of the AP/bSTA's own broadcasts). CToA cSTAs may listen to a channel for a period, which may be relative to a CToA beacon broadcasting rate, and may receive any timing information necessary to estimate its own cSTA device location. For network-centric applications (e.g., such as asset tracking, user-data analytics etc.) and/or a combination of legacy network transmissions with CToA broadcasts for client location, an unmanaged CToA scheme may be assumed.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment, according to some example embodiments of the present disclosure. Wireless network 100 may include one or more user device(s) 120 and one or more access point(s) (AP) 102, which may communicate in accordance with IEEE 802.11 communication standards, such as, the IEEE 802.11ax specification. The user device(s) 120 may be mobile devices that are non-stationary and do not have fixed locations.

Figure 7:
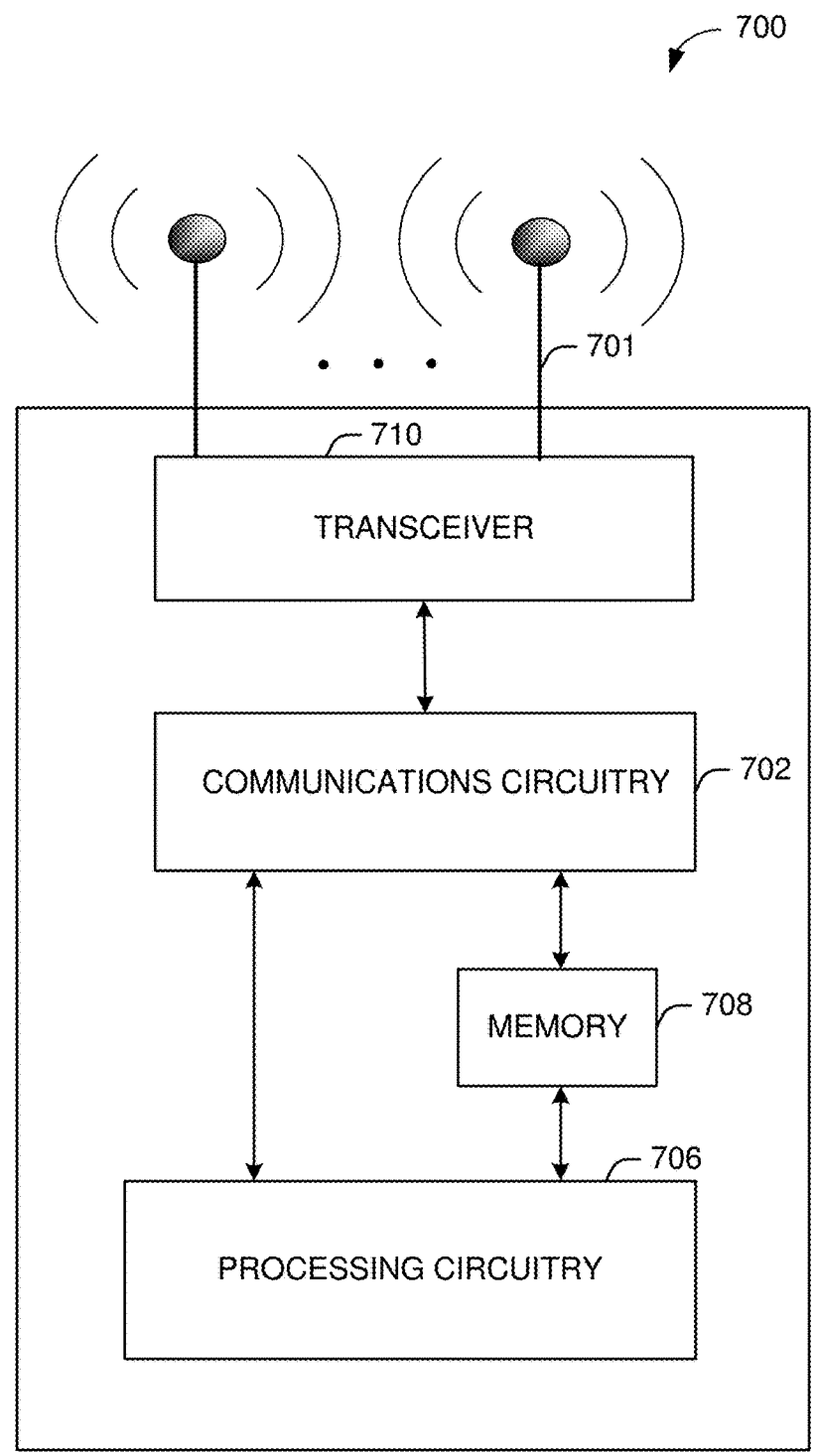
FIG. 7 illustrates a functional diagram of an example communication station that may be suitable for use as a user device, in accordance with one or more example embodiments of the disclosure.
Figure 8:
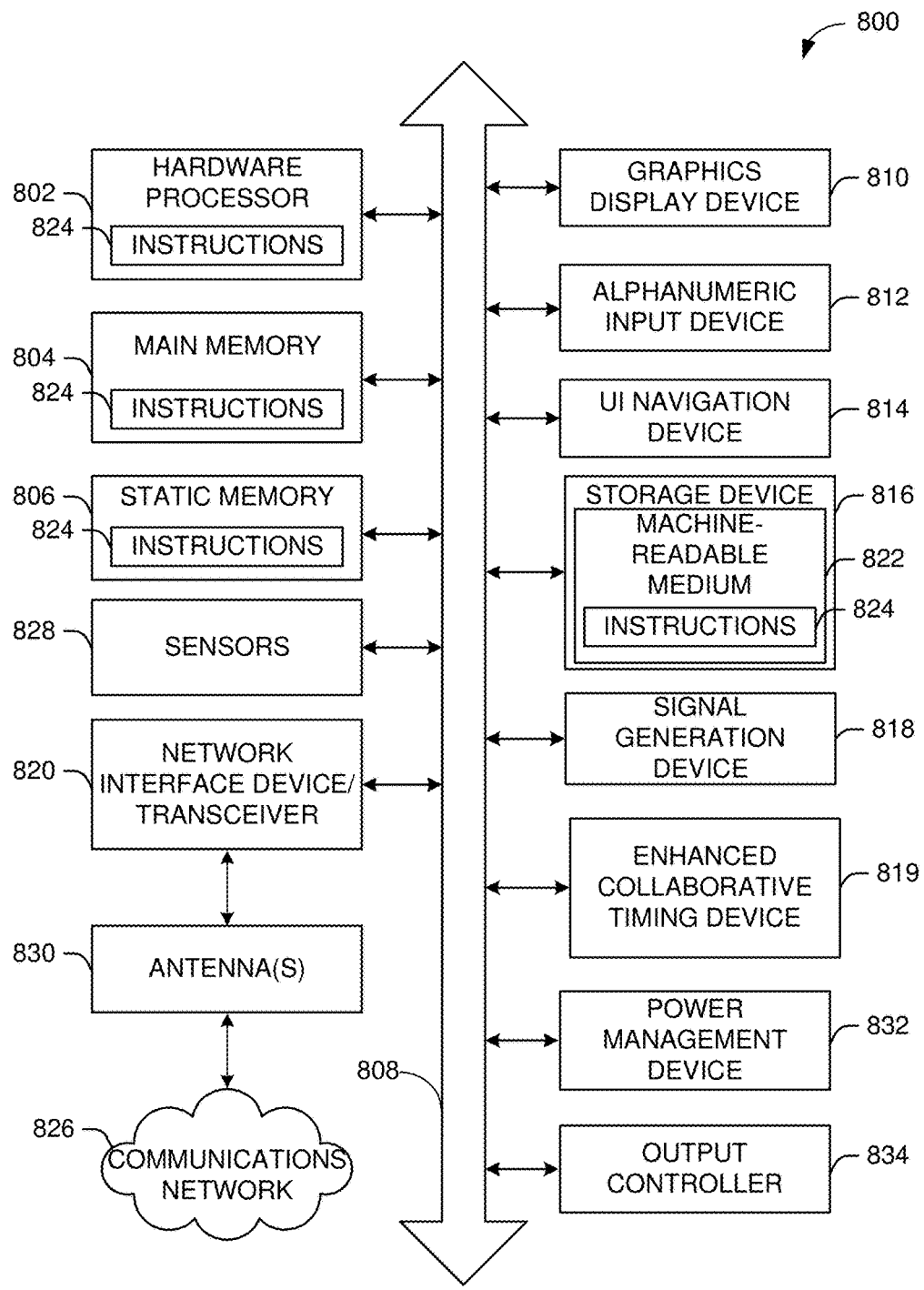
FIG. 8 is a block diagram of an example machine upon which any of one or more techniques (e.g., methods) may be performed, in accordance with one or more embodiments of the disclosure.

In some embodiments, the user device(s) 120 and AP 102 may include one or more computer systems similar to that of the functional diagram of FIG. 7 and/or the example machine/system of FIG. 8.

One or more illustrative user device(s) 120 and/or AP 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP 102 may operate as a personal basic service set (PBSS) control point/access point (PCP/AP). The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, for example, a DMG device, an EDMG device, a UE, an MD, a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennae. Communications antenna may be any suitable type of antenna corresponding to the communications protocols used by the user device(s) 120 (e.g., user devices 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user device(s) 120.

Any of the user device(s) 120 (e.g., user devices 124, 126, 128), and/or AP 102 may include any suitable radio and/or transceiver for transmitting and/or receiving radio frequency (RF) signals in the bandwidth and/or channels corresponding to the communications protocols utilized by any of the user device(s) 120 and/or AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11az). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The phrases "directional multi-gigabit (DMG)" and "directional band" (DBand), as used herein, may relate to a frequency band wherein the channel starting frequency is above 45 GHz. In one example, DMG communications may involve one or more directional links to communicate at a rate of multiple gigabits per second, for example, at least 1 Gigabit per second, 7 Gigabit per second, or any other rate.

In some demonstrative embodiments, user device(s) 120 and/or AP 102 may be configured to operate in accordance with one or more specifications, for example, including, one or more IEEE 802.11 specifications, e.g., an IEEE 802.11ax specification and/or any other specification and/or protocol.

Some specifications may be configured to support a single user (SU) system, in which an STA cannot transmit frames to more than a single STA at a time. Such specifications may not be able, for example, to support a STA transmitting to multiple STAs simultaneously, for example, using an MU-MIMO scheme, e.g., a downlink (DL) MU-MIMO, or any other MU scheme.

In some demonstrative embodiments, user device(s) 120 and/or AP 102 may be configured to implement one or more Multi-User (MU) mechanisms. For example, user device(s) 120 and/or AP 102 may be configured to implement one or more MU mechanisms, which may be configured to enable MU communication of Downlink (DL) frames using a MIMO scheme, for example, between a device, e.g., AP 102, and a plurality of user devices, e.g., including user device(s) 120 and/or one or more other devices.

In some demonstrative embodiments, and/or AP 102 may be configured to communicate over a Next Generation 60 GHz (NG60) network, an Extended DMG (EDMG) network, and/or any other network. For example, and/or AP 102 may be configured to communicate MIMO, e.g., DL MU-MIMO, transmissions and/or use channel bonding, for example, for communicating over the NG60 and/or EDMG networks.

In some demonstrative embodiments, and/or AP 102 may be configured to support one or more mechanisms and/or features, for example, channel bonding, single user (SU) MIMO, and/or and multi user (MU) MIMO, for example, in accordance with an EDMG Standard, an IEEE 802.11ax standard and/or any other standard and/or protocol.

In one embodiment, and with reference to FIG. 1, AP 102 may be configured to communicate with one or more STAs, such as, user devices 120. The user devices 120 may be AS devices and/or client devices. AP 102 and the user devices 120 may exchange frames 140. For example, frames 140 may be used in an enhanced CToA operation. The frames 140 may include trigger frames, NDPs, NDPAs, LRMs, and other types of frames.

Figure 2:
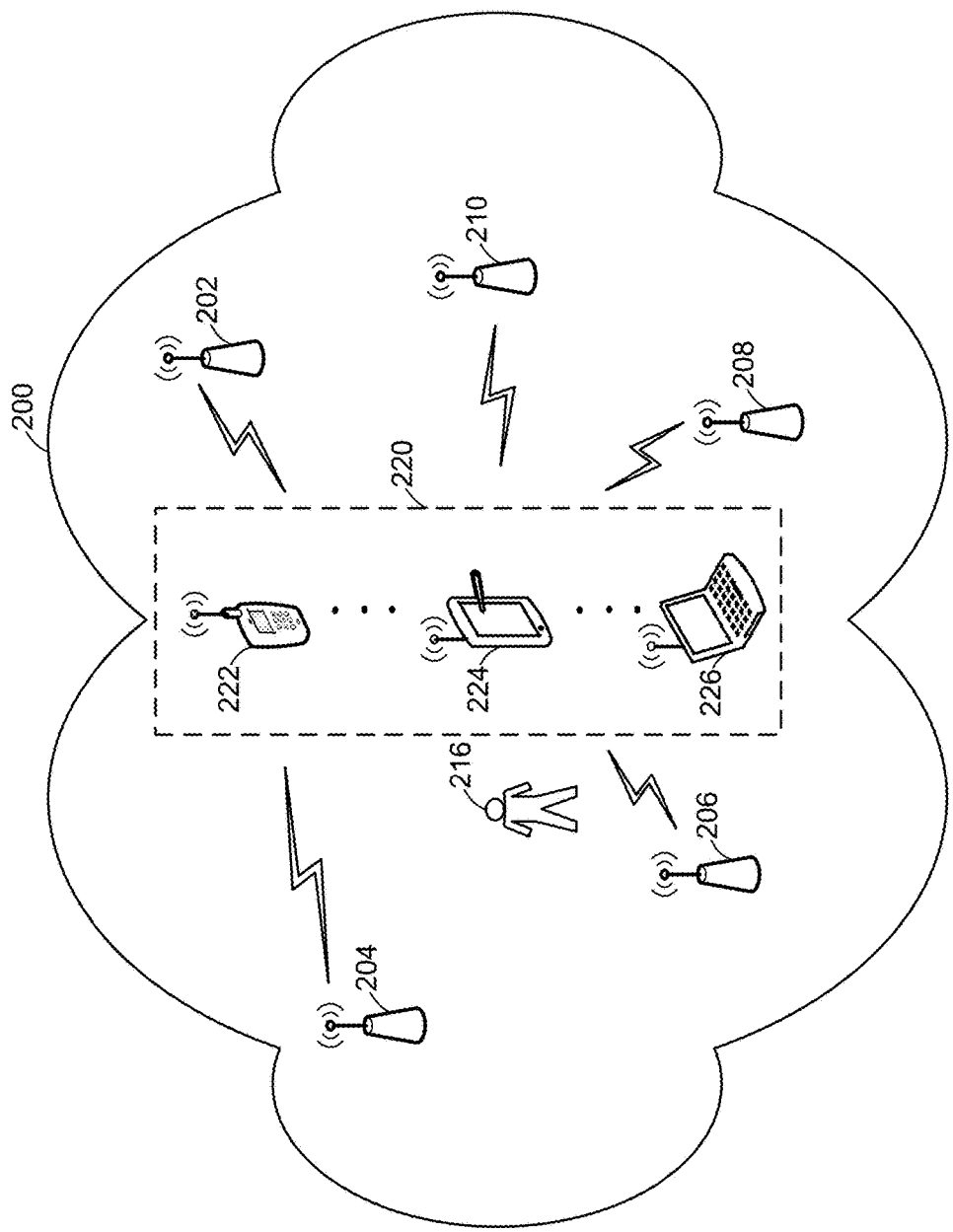
FIG. 2 depicts a network of inter-access point and intra-access point venues, in accordance with one or more example embodiments of the present disclosure.

FIG. 2 depicts a network 200 of inter-access point and intra-access point venues, in accordance with one or more example embodiments of the present disclosure.

Referring to FIG. 2, the network 200 may be associated with a crowded environment such as a stadium, arena, or dense area (e.g., a city center). The network 200 may include multiple APs, such as AP 202, AP 204, AP 206, AP 208, and AP 210. Any number of APs may be included. A user 216 may have a user device, such as the one or more user devices 220 (e.g., user device 222, user device 224, user device 226). The one or more user devices 220 may include AS devices and/or client devices. For example, the user 216 may move within network 200 while possessing user device 226, including in and out of intra-AP and inter-AP networks.

In one or more embodiments, a network may include an AP and its associated devices (e.g., AP 202, user device 222, user device 224). The user 216 may move near AP 202, which may use IEEE 802.11 trigger-based communications. For example, user device 222 and user device 224 may be AS devices, and AP 202 may trigger UL transmissions from user device 222 and user device 224 for CToA operations. As the AP 202, the user device 222, and user device 224 exchange messages for CToA operations, the user device 226 may identify the CToA messages and may estimate its position. For example, if the user 216 moves from AP 208 toward AP 202, the user device 226 may continue to estimate its position by identifying CToA messages associated with AP 202.

Figure 3:
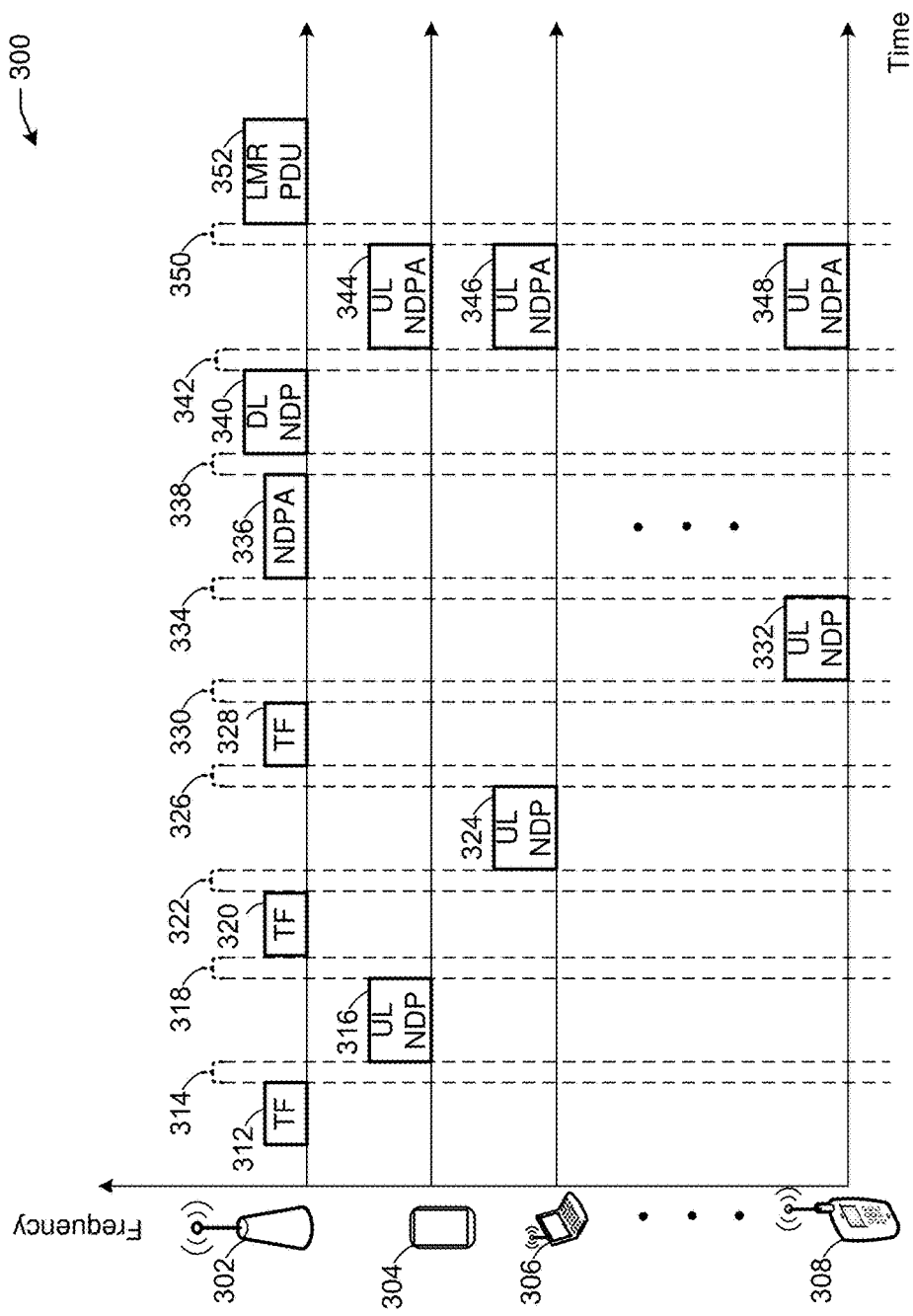
FIG. 3 illustrates an enhanced intra-access point collaborative time of arrival (CToA) operation, in accordance with one or more example embodiments of the present disclosure.

FIG. 3 illustrates an enhanced intra-AP CToA operation 300, in accordance with one or more example embodiments of the present disclosure.

Referring to FIG. 3, an AP 302 may be associated with user device 304, user device 306, and user device 308, or any number of user devices. The enhanced intra-AP CToA operation 300 may be trigger-based. The AP 302 may send a trigger frame 312, which may be addressed to one or more of the user devices. If trigger frame 312 identifies user device 304, user device 304 may, after a time 314 (e.g., short interframe space), may send a frame (e.g., UL NDP 316). After a time 318 (e.g., short interframe space), AP 302 may send a trigger frame 320, which may identify user device 306. After a time 322 (e.g., short interframe space), user device 306 may send a frame (e.g., UL NDP 324). After a time 326 (e.g., short interframe space), AP 302 may send a trigger frame 328, which may identify user device 308. After a time 330 (e.g., short interframe space), user device 308 may send a frame (e.g., UL NDP 332). After any or all user devices have sent UL frames (e.g., so that AP 302 may measure and log the time of arrival of any associated user devices), AP 302 may wait a time 334 (e.g., short interframe space) before sending a null data packet announcement (e.g., NDPA 336), which may indicate any times of arrival of the UL frames received from the user devices, and which may indicate a subsequent DL NDP which the AP 302 may send. After a time 338 (e.g., short interframe space), AP 302 may send a DL frame (e.g., DL NDP 340), which may be received by any nearby user device (e.g., a stray client device in the area, such as user device 226 of FIG. 2) and measured for its respective time of arrival. After a time 342 (e.g., short interframe space), any user device which receives the DL NDP 340 may send a UL frame. For example, user device 304 may send UL NDPA 344, user device 306 may send UL NDPA 346, and user device 308 may send UL NDPA 348, any of which may overlap in time. After a time 350 (e.g., short interframe space), AP 302 may send an LMR (e.g., LMR PDU 352), which may indicate any of the times of arrival and departure data provided by the UL frames sent by the user devices. This way, any nearby device may collect time of arrival and departure data which may be used by any respective device to estimate its position.

In one or more embodiments, within an intra-AP venue, a scalable location may be based on the protocol according to the enhanced intra-AP CToA operation 300. The protocol may be scheduled by the AP 302 (e.g., an AP defined by the IEEE 802.11ax standard). The AP 302 may provide resource allocations to any associated user device so that, for example, the user devices may determine when to transmit, when to listen, which frequency to use, etc. The enhanced intra-AP CToA operation 300 may generally follow an 802.11ax-based MU ranging operation (e.g., an HEz-MU ranging messaging sequence). An entire transaction may occur within a single TXOP, which may begin with a trigger frame.

In one or more embodiments, the enhanced intra-AP CToA operation 300 may assume that all the AS devices (e.g., user device 304, user device 306, user device 308) may upload their respective LMRs (e.g., UL NDPA 344, UL NDPA 346, UL NDPA 348) to AP 302 using a HE-MU OFDMA multiplexing frame (e.g., using diversity of frequency, spatial, code division, etc.). For example, UL NDPA 344, UL NDPA 346, and UL NDPA 348 may be sent on different frequencies at the same time/during overlapping time slots. The frequencies may be allocated to the respective AS devices (e.g., user device 304, user device 306, user device 308). AP 302 may collect all of the LMRs and determine the respective clock error offsets in PPM of any user device. AP 302 may broadcast the LMR PDU 352, which may indicate the times of arrival from the LMRs and the clock error offsets. One reason that the AP 302 may broadcast the aggregated time of arrival results is because the AS uplink transmissions may be MU multiplexed, and therefore may be optimized for the respective instantaneous channel observed between the AP 302 and the respective user device. Because a user device may not be able to receive a respective UL transmission from another user device based on the MU scheme, the AP 302 may aggregate the LMRs on behalf of the user devices, and may send them in a DL LMR broadcast, thereby increasing the probability of reception by all the clients listening to the transaction.

Figure 4:
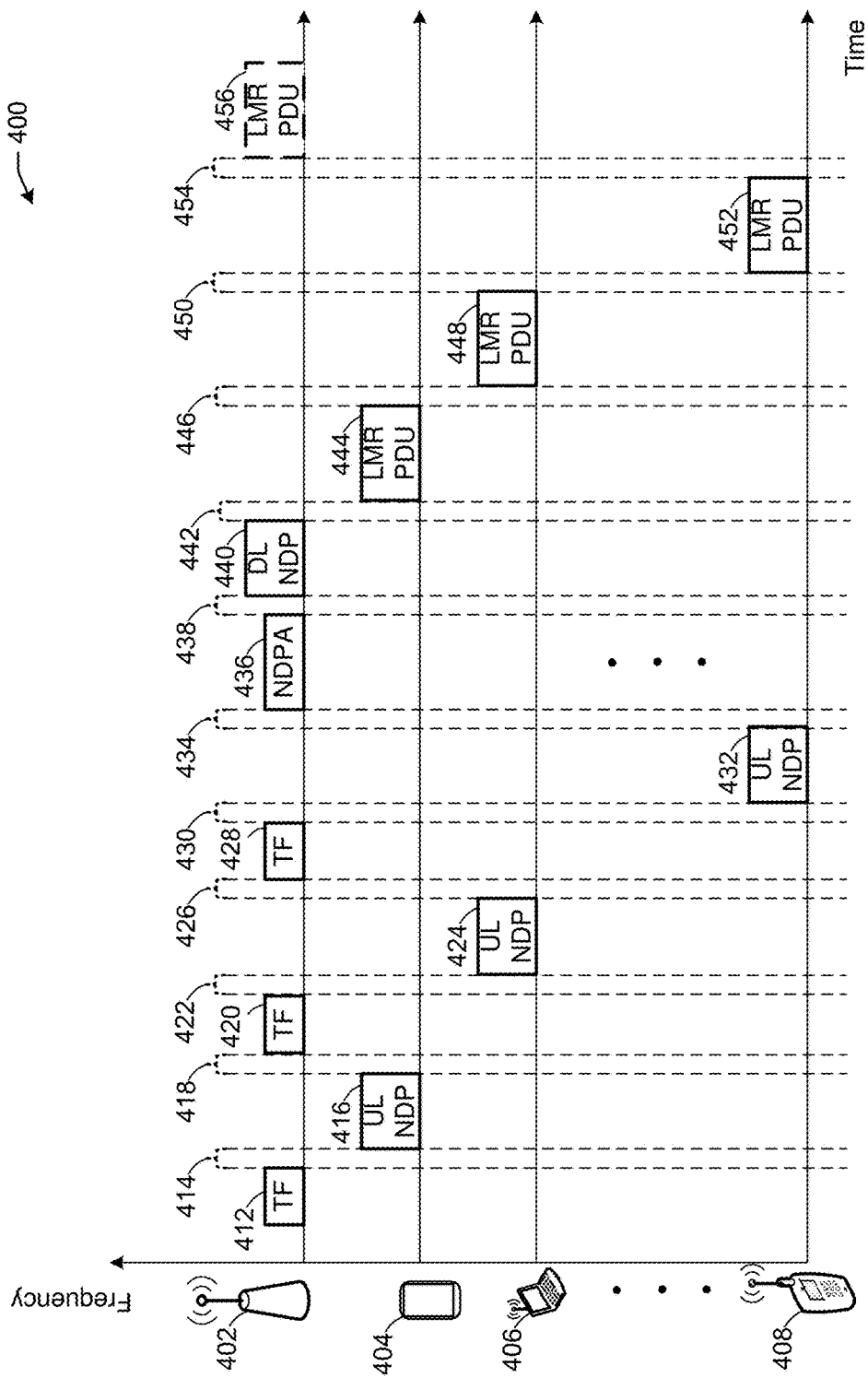
FIG. 4 illustrates an enhanced intra-access point CToA operation, in accordance with one or more example embodiments of the present disclosure.

FIG. 4 illustrates an enhanced intra-access point CToA operation 400, in accordance with one or more example embodiments of the present disclosure.

Referring to FIG. 4, an AP 402 may be associated with user device 404, user device 406, and user device 408, or any number of user devices. The enhanced intra-AP CToA operation 400 may be trigger-based. The AP 402 may send a trigger frame 412, which may be addressed to one or more of the user devices. If trigger frame 412 identifies user device 404, user device 404 may, after a time 414 (e.g., short interframe space), may send a frame (e.g., UL NDP 416). After a time 418 (e.g., short interframe space), AP 402 may send a trigger frame 420, which may identify user device 406. After a time 422 (e.g., short interframe space), user device 406 may send a frame (e.g., UL NDP 424). After a time 426 (e.g., short interframe space), AP 402 may send a trigger frame 428, which may identify user device 408. After a time 430 (e.g., short interframe space), user device 408 may send a frame (e.g., UL NDP 432). After any or all user devices have sent UL frames (e.g., so that AP 402 may measure and log the time of arrival of any associated user devices), AP 402 may wait a time 434 (e.g., short interframe space) before sending a null data packet announcement (e.g., NDPA 436), which may indicate any times of arrival of the UL frames received from the user devices, and which may indicate a subsequent DL NDP which the AP 402 may send. After a time 438 (e.g., short interframe space), AP 402 may send a DL frame (e.g., DL NDP 440), which may be received by any nearby user device (e.g., a stray client device in the area, such as user device 226 of FIG. 2) and measured for its respective time of arrival. After a time 442 (e.g., short interframe space), any user device which receives the DL NDP 340 may send a UL frame. For example, user device 404 may send LMR PDU 444. After a time 446 (e.g., short interframe space) user device 406 may send LMR PDU 448. After a time 450 (e.g., short interframe space), user device 408 may send LMR PDU 452. After a time 454 (e.g., short interframe space), AP 402 optionally (as explained below) may send an LMR (e.g., LMR PDU 456), which may indicate any of the times of arrival and departure data provided by the UL frames sent by the user devices. This way, any nearby device may collect time of arrival and departure data which may be used by any respective device to estimate its position.

In or more embodiments, the intra-access point CToA operation 400 may assume that any user device (e.g., AS devices such as user device 404, user device 406, user device 408) may broadcast their respective LMRs in a PDU data frame which may be decoded by AP 402 and/or any client device listening to the relevant communication channel.

In one or more embodiments, there may be a PPM correction of device clocks (e.g., crystal oscillators) for any user device/AS device. A length of a TXOP may extend a time (e.g., ~1 ms). A device crystal oscillator with a +/−1 PPM accuracy may accumulate a clock offset error (e.g., +/−1 ns, equivalent to ~+/−3 m ranging error, or =/−25 ns=+/−8 m) for a typical 25 PPM crystal oscillator. Thus, a PPM offset estimated during a TXOP between an AS (e.g. user device 404, user device 406, user device 408) and AP 402 may be announced and/or corrected by only one side (e.g., one of the AP 402 or the respective AS device). The protocol may support several options. AP 402 may estimate a PPM offset of any AS, and may broadcast the results in a PDU data frame (e.g., LMR PDU 456) after any respective HE-MU frames which upload respective AS LMRs to the AP 402.

In one or more embodiments, any AS may estimate a PPM offset with respect to the AP 402. Any AS and may broadcast the PPM crystal oscillator/clock results in a PDU data frame broadcast (e.g., LMR PDU 444, LMR PDU 448, LMR PDU 452). AP 402 may aggregate reports (e.g., UL LMRs) from any AS devices, and may send the estimated PPM offsets in a data PDU (e.g., LMR PDU 456).

In one or more embodiments, the AP 402 may not need to send a DL LMR with aggregated LMR and/or PPM clock data. Any AS may estimate a clock/PPM offset relative to the AP 402 (e.g., based on the timing of DL frames received from the AP 402), and may broadcast the results in a PDU data frame broadcast (e.g., LMR PDU 444, LMR PDU 448, LMR PDU 452). In this case, an optional AP LMR PDU at the end of the AS LMR broadcasts may not be needed because any nearby device may receive the LMR PDU broadcasts from other devices (e.g., because the broadcasts may be sent at different times and not in MU fashion).

In one or more embodiments, any device may log measurements over any time interval (e.g., a number of seconds). Any transmitted packet may include a TX AS ID, NDP time of departure (ToD), and a TX MAC address or own MAC. A received packet may include a PID, an NDP ToA, TX MAC, TX AS ID, receiver (RX) MAC or own MAC, and an RX AS ID.

A cSTA broadcast timing measurement logging format (and its associated number of bits) is shown below in Table 1.

TABLE 1

| \multicolumn{6}{c}{cSTA Broadcast Timing Measurements Logging Format} |||||||
|---|---|---|---|---|---|
| TX AS ID | TX MAC | ToD | RX AS ID | RX MAC | ToA |
| 4 bits | 48 bits | 48 bits | 4 bits | 48 bits | 48 bits |

A PPM offset is reported below in Table 2. An information entry for a PPM offset may include a MAC address of a managing AP, a MAC address of an AS device, a PPM offset measure (e.g., in an accuracy of 0.01 PPM or better), and a bit indicating which side estimated the offset (e.g., 0 for the AP, 1 for the AS, or vice versa).

TABLE 2

| PPM Offset Information Entry Table Entry ||||
|---|---|---|---|
| AP MAC | AS MAC | PPM Offset | Estimated By AP or AS |
| 48 bits | 48 bits | 32 bits | 1 bit |

It is understood that the above descriptions are for purposes of illustration and are not meant to be limiting.

Figure 5:
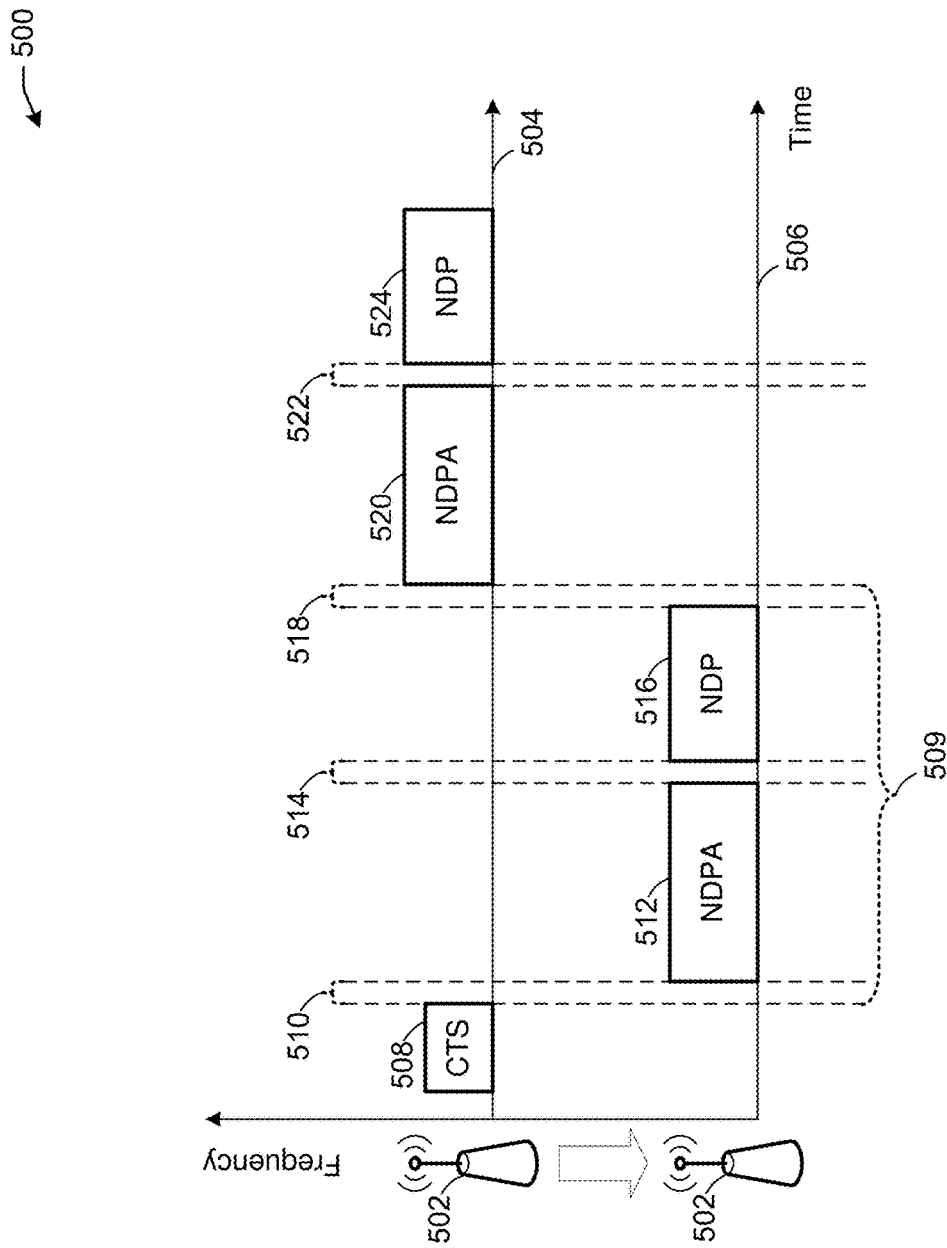
FIG. 5 illustrates an enhanced CToA operation for inter-access point venues, in accordance with one or more example embodiments of the present disclosure.

FIG. 5 illustrates an enhanced CToA operation 500 for inter-AP venues, in accordance with one or more example embodiments of the present disclosure.

Referring to FIG. 5, an AP 502 may operate in a channel 504 (e.g., a native channel), and may hop to other channels (e.g., channel 506). When leaving channel 504 to hop to another channel, AP 502 may send a frame (e.g., CTS-to-Self frame 508) in channel 504 so that associated and/or unassociated devices (e.g., user devices 220 of FIG. 2) of a BSS may be notified of upcoming unavailability of AP 502 on channel 504. AP 502 may indicate or negotiate unavailability with BSS devices according to a time synchronization factor. AP 502 may be aware of channel 506 and any other channels where other APs/bSTAs operate because AP 502 may have scanned for such channels. On channel 506 or any other channel, after a time 510, AP 502 may broadcast a CToA beacon, which may include an NDPA (e.g., NDPA 512), followed by a time 514, followed by an NDP (e.g., NDP 516). NDP 516 may include an information element indicating previous time of arrival and departure measurements (e.g., from the past X seconds). The time of arrival measurements may be based on respective times of arrival of UL frames sent by other devices, and the time of departure measurements may be based on the times of departure of DL broadcasts sent by AP 502. CToA client STAs (e.g., user devices 220 of FIG. 2) may listen to channel 506 for a period of time relative to a CToA broadcasting rate, and may receive timing information which may be used by the devices to estimate their respective locations. After a time 518, AP 502 may return to channel 504 and send a CToA broadcast in channel 504 (e.g., NDPA 520, followed by a time 522, followed by NDP 524), which may be received by any devices in channel 504. Such a process may allow devices in different channels to receive relevant data for CToA operations from APs in other channels because APs may hop between multiple channels to send CToA data. Such operations may facilitate CToA calculations in an inter-AP environment with many APs, for example.

In one or more embodiments, for network-centric applications such as asset tracking and user-data analytics, and/or for a combination of legacy network transmissions with CToA broadcasts for a client device location, an unmanaged CToA scheme may be used.

It is understood that the above descriptions are for purposes of illustration and are not meant to be limiting.

Figure 6A:
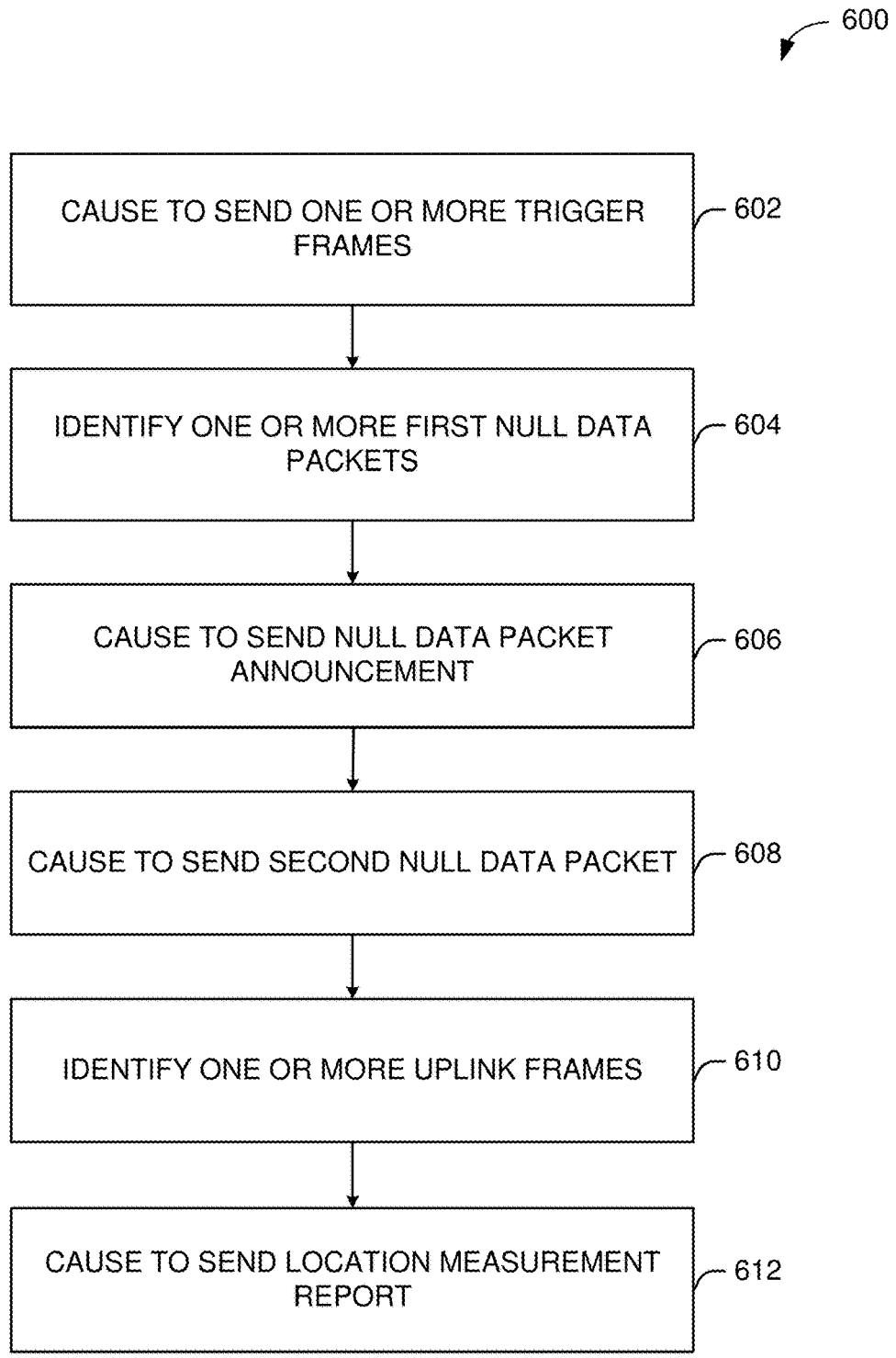
FIG. 6A illustrates a flow diagram of an illustrative process for enhanced CToA, in accordance with one or more example embodiments of the present disclosure.

FIG. 6A illustrates a flow diagram of an illustrative process 600 for enhanced CToA, in accordance with one or more example embodiments of the present disclosure.

At block 602, one or more processors of a device (e.g., the AP 102 of FIG. 1) may cause the device to send one or more trigger frames (e.g., trigger frame 312, trigger frame 320, trigger frame 328 of FIG. 3). Any trigger frame the device sends may identify one or more devices to send UL frames in response. The trigger frames may indicate that one or more devices are to send UL frames, and that one or more devices are not supposed to send UL frames in response.

At block 604, the one or more processors of the device may identify one or more NDPs or other UL frames (e.g., UL NDP 316, UL NDP 324, UL NDP 332 of FIG. 3) received from respective AS devices. For example, any AS devices (e.g., user device 304, user device 306, user device 308) addressed by a trigger frame received from the device may send a UL frame, and the device may log the respective arrival times of any received UL frame.

At block 606, the one or more processors of the device may cause the device to send an NDPA (e.g., NDPA 336 of FIG. 3). The NDPA may indicate any arrival times logged by the device for received UL frames sent by AS devices. The NDPA may indicate that the device may send a subsequent DL frame. The device may send an NDPA after receiving any or all UL frames and logging arrival times from any or all nearby devices.

At block 608, the one or more processors of the device may cause the device to send a DL frame (e.g., DL NDP 340 of FIG. 3). A DL frame sent by the device may be received by any nearby devices, and the nearby devices may log the respective arrival time of a DL frame sent by the device. This way, any nearby device may use the arrival time of DL frames sent by the device in CToA calculations to determine a respective device position.

At block 610, the one or more processors of the device may identify one or more UL frames (e.g., UL NDPA 344, UL NDPA 346, UL NDPA 348 of FIG. 3) received from respective AS devices. Any AS device may send a UL NDPA indicating the time of arrival of any DL frames (e.g., DL NDP 340 of FIG. 3) sent by the device. The UL frames may be sent at the same time or during overlapping timeslots based on resources allocated by the device. For example, the device may allocate frequencies and resource units to the AS devices, and the AS devices may send UL frames using those resources (e.g., using different respective frequencies). Because the AS devices may be using their respective resources, one AS device may not be able to receive and decode a UL frame sent by another AS device. Therefore, not all AS devices or nearby client devices may be aware of the arrival times of DL frames at other AS devices. Because arrival and departure time data of various frames to/from the respective AS devices may be useful in CToA calculations, the device may aggregate the time of arrival and departure data indicated by the respective UL frames.

In one or more embodiments, the one or more UL frames may be sent and received at different times (e.g., using shared frequencies) so that any nearby device may receive the UL frames. For example, LMR PDU 444, LMR PDU 448, and LMR 452 of FIG. 4 may be the UL frames, and they may be sent at different times according to allocations provided by the device. In this manner, any nearby device (e.g., including a client device passing by) may receive the LMR PDUs and use the time of arrival and departure data of received and sent frames indicated by the LMR PDUs to perform CToA calculations used to estimate device position. The devices which send the UL frames may determine clock offsets based on received DL frames from the device, and may indicate the clock offsets in the UL frames so that the device may collect that information and include it in subsequent DL transmissions.

At block 612, the one or more processors of the device may collect the time of arrival and departure data indicated by the respective UL frames, and may send one or more LMRs (e.g., LMR PDU 352 of FIG. 3). An LMR sent by the device may indicate the times of arrival and departure collected from the UL frames sent by the AS devices. This way, when an AS device or client device receives an LMR from the device, the receiving device may perform CToA calculations to estimate its respective device position using the timing data provided by the other devices. If the UL frames received by the device are sent at different (e.g., non-overlapping times as in FIG. 4), the device may not need to send a LMR, or may omit either the clock offset data or the arrival and departure time data from an LMR because other devices may be able to receive that data in the UL frames sent at different times.

In one or more embodiments, the device may estimate clock error offsets (e.g., in PPM) for any or all respective device which sends UL frames. For example, using the UL NDPA 344, UL NDPA 346, and UL NDPA 348 of FIG. 3, the device may determine respective clock offsets for user device 304, user device 306, and user device 308. The LMR also may indicate the clock offsets so that any device which receives the LMR may identify its respective clock offset and adjust its clock accordingly.

In one or more embodiments, the device may temporarily leave one or more respective native channels (e.g., channel 504 in FIG. 5) to join other channels (e.g., channel 506 of FIG. 5) to provide timing data to devices in the other channels. For example, the device may send one or more frames (e.g., CTS-to-Self frame 508 of FIG. 5) to nearby user devices (e.g., user device 304, user device 306, user device 308 of FIG. 3) indicating that the device may be unavailable for a given time. The device may join another channel (e.g., channel 506 of FIG. 5), and may send a sequence of frames (e.g., NDPA 512 and NDP 516 of FIG. 5) to devices in that channel. The NDPA may indicate the time of arrival and departure data of user devices based on received UL frames (e.g., UL NDPA 344, UL NDPA 346, and UL NDPA 348 of FIG. 3) so that other devices may use the timing data of devices in other channels for CToA calculations. The NDP may be sent so that devices in the other channels may identify a time of arrival of a frame sent by the device for CToA calculations. The device may return to its native channel and continue CToA operations.

Figure 6B:
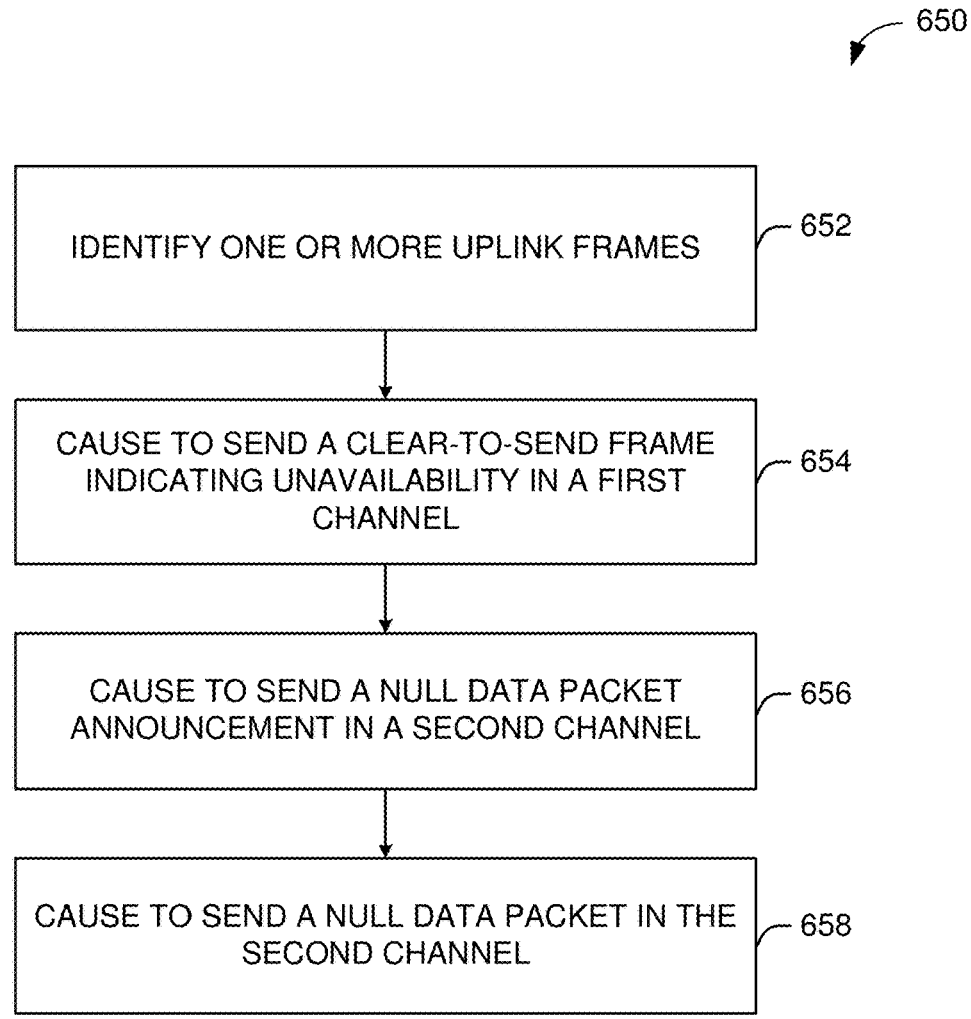
FIG. 6B illustrates a flow diagram of an illustrative process for enhanced CToA, in accordance with one or more example embodiments of the present disclosure.

FIG. 6B illustrates a flow diagram of an illustrative process 650 for enhanced CToA, in accordance with one or more example embodiments of the present disclosure.

At block 652, one or more processors for a device (e.g., AP 102 of FIG. 1) may identify one or more uplink frames received from nearby devices. For example, the device may send one or more trigger frames indicating that one or more particular devices should respond by sending UL frames. The device may log the respective time of arrival of a UL frame for CToA calculations, and may indicate times of arrival associated with UL frames and times of departure associated with DL frames in subsequent DL communications so that nearby devices may use the time data for CToA calculations.

At block 654, the one or more processors for the device may cause the device to send a frame (e.g., CTS-to-Self frame 508 of FIG. 5) to nearby devices on one or more channels (e.g., channel 504) to indicate that the device may be unavailable on the one or more channels for a period of time. For example, the device may temporarily leave one or more native channels to provide time of arrival and departure data to other devices on other channels (e.g., channel 506 of FIG. 5).

At block 656, the one or more processors for the device may cause to send a NDPA (e.g., NDPA 512 of FIG. 5) indicating time of arrival data collected by the device from UL frames received in a native channel. In this manner, devices operating in the channel different from the device's native channel may receive data which may be used in CToA calculations. The NDPA may indicate that a subsequent DL frame may be sent by the device.

At block 658, the one or more processors for the device may cause the device to send a DL frame (e.g., NDP 516 of FIG. 5). The NDP may be sent in a channel different from the device's native channel so that devices in the non-native channel may log the time of arrival of the DL frame from the device and use that time of arrival in CToA calculations. The device may repeat the sending of NDPA and NDP frames in other channels to provide the timing data to other devices. The device may return to its native channel and continue CToA operations. For example, the device may perform another round of CToA operations by collecting new time of arrival data from received UL frames from devices on the native channel, and the device again may switch to other channels to provide the updated time of arrival and departure data.

It is understood that the above descriptions are for purposes of illustration and are not meant to be limiting FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or user device 120 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The transceiver 710 may be a device comprising both a transmitter and a receiver that are combined and share common circuitry (e.g., communication circuitry 702). The communication circuitry 702 may include amplifiers, filters, mixers, analog to digital and/or digital to analog converters. The transceiver 710 may transmit and receive analog or digital signals. The transceiver 710 may allow reception of signals during transmission periods. This mode is known as full-duplex, and may require the transmitter and receiver to operate on different frequencies to minimize interference between the transmitted signal and the received signal. The transceiver 710 may operate in a half-duplex mode, where the transceiver 710 may transmit or receive signals in one direction at a time.

The communications circuitry 702 may include circuitry that may operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 2, 3, 4, 5, 6A, and 6B.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), an enhanced collaborative timing device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The enhanced collaborative timing device 819 may carry out or perform any of the operations and processes (e.g., process 600 of FIG. 6A and process 650 of FIG. 6B) described and shown above.

In one or more embodiments, the enhanced collaborative timing device 819 may: cause to send one or more trigger frames; identify one or more NDPs received from respective anchor station devices, wherein the one or more NDPs comprise a first NDP received from a first anchor station device of the respective anchor station devices at a first time and a second NDP received from a second anchor station device of the respective anchor station devices at a second time; cause to send a first NDPA, the first NDPA indicating the first time and the second time; cause to send a third NDP; identify one or more uplink NDPAs received from the respective anchor station devices, the one or more uplink NDPAs comprising a second NDPA received from the first anchor station device and a third NDPA received from the second anchor station device, wherein the second NDPA indicates a first time of arrival of the third NDP at the first anchor station device and a second time of arrival of the second NDP at the first anchor station device, and wherein the third NDPA indicates a third time of arrival of the third NDP at the second anchor station device and a fourth time of arrival of the first NDP at the second anchor station device; and cause to send a LMR PDU, the LMR PDU indicating the first time of arrival, the second time of arrival, the third time of arrival, and the fourth time of arrival.

In one or more embodiments, the enhanced collaborative timing device 819 may perform operations including: causing to send, by a device, one or more trigger frames; identifying one or more NDPs received from respective anchor station devices, wherein the one or more NDPs comprise a first NDP received from a first anchor station device of the respective anchor station devices at a first time and a second NDP received from a second anchor station device of the respective anchor station devices at a second time; causing to send a NDPA, the NDPA indicating the first time and the second time; causing to send a third NDP; and identifying one or more LMR PDUs received from the respective anchor station devices, the one or more LMR PDUs comprising a first LMR PDU received from the first anchor station device and a second LMR PDU received from the second anchor station device, wherein the first LMR PDU indicates a first time of arrival of the third NDP at the first anchor station device and a second time of arrival of the second NDP at the first anchor station device, and wherein the second LMR PDU indicates a third time of arrival of the third NDP at the second anchor station device and a fourth time of arrival of the first NDP at the second anchor station device.

In one or more embodiments, the enhanced collaborative timing device 819 may estimate a location while maintaining privacy. CSTAs may listen only to bSTA broadcasts (e.g., broadcasts of known bSTAs associated with an access point). Once a cSTA receives a broadcast, the cSTA may measure a time of arrival of the broadcast at the cSTA and may and combines the time of arrival with other time of arrival and time of departure data logged by the cSTA and published by bSTAs in CToA beacons to determine cSTA position. Because cSTAs may not transmit, their presence may not exposed and their privacy may be maintained.

In network-mode, a network administrator simultaneously may track the position of a large number of client devices. CToA client devices operating in network-mode may not listen for CToA beacons, but only may transmit CToA beacons to enable a network administrator to track device position.

In one or more embodiments, the enhanced collaborative timing device 819 may include the use of unmanaged and unsynchronized CToA bSTAs. The bSTAs, which may be in known locations, periodically may broadcast beacons indicating the respective time of departure of each beacon. Neighbor bSTAs and other client devices which receive a beacon may log the time of arrival of the beacon. Any bSTA may publish its most recently logged time of arrival in a subsequent beacon. CToA client devices may receive beacons from other devices and may combine the time of arrival data from those beacons (e.g., times of arrival at other devices) with the times of arrival at a given client device. Using the aggregated time of arrival data from multiple devices, a device may estimate its own location. In a network-mode, client devices may send time of arrival data to a central positioning server, which may aggregate time of arrival data from multiple devices and may estimate the location of the multiple devices.

In one or more embodiments, the enhanced collaborative timing device 819 may send a CToA beacon. A CToA beacon may associated with a unique PID, which may be assigned by the broadcasting device. The PID is typically implemented as a running counter, and is independently maintained by any bSTA. A CToA beacon may include a time of departure time-stamp (e.g., measured by the broadcasting device), and multiple time of arrival measurements, which may be associated with the same PID. The PID enables CToA client devices (e.g., operating in "client-mode"), or a positioning server (e.g., in "network-mode") to associate between the time of departure and corresponding time of arrival measurements collected either by the client device itself or by different bSTAs. In addition to a time of departure, some of the CToA beacons broadcast by bSTAs also may include a data log of timing measurements collected by a bSTA during the past x-seconds. This data log may be referred to as "CToA location measurement report" (CLMR). The timing measurements included in the CLMR reports may be used by a cSTA, which may combine the data with its own time of arrival measurements to estimate the cSTA's position. Although the CLMR logs are maintained by each of the bSTAs independently, the protocol also enables the CLMR logs broadcast by one bSTA to be aggregated by its neighbors, thereby providing an immunity mechanism against "hidden nodes" in a wireless network.

In one or more embodiments, the enhanced collaborative timing device 819 may use the principles of the channel sounding mechanism defined by the IEEE 802.11ac standard. The channel sounding protocol, which was originally proposed for determining optimal beamforming weights at a transmitter side, relies on a transmission of a NDP, which may include only a known sequence of OFDM symbols, but with no data payload. The transmission of a NDP may be preceded by a NDPA, which may inform receivers of a coming NDP frame. The NDPA may include information for a receiver to estimating a channel response.

In one or more embodiments, the enhanced collaborative timing device 819 may scan a spectrum to detect prior CToA broadcast activity, and once detected, the bSTA may contend for access of a channel to broadcast its beacons, and may listen to broadcasts of neighbor devices during a remaining time.

In one or more embodiments, the enhanced collaborative timing device 819 may need to provide data transaction services to associated STAs. An AP/bSTA periodically may scan a spectrum to detect CToA broadcast activity. After receiving scan results, the AP/bSTA may announce an "unavailability window" to associated STAs. During the unavailability window, the AP/bSTA may "hop" to other native channels of neighbor APs/bSTAs. In each channel, the AP/bSTA may broadcast a short CToA beacon, which may include time of departure, but not a CLMR. When the AP/bSTA returns to its native channel, the AP/bSTA may broadcast a longer CToA beacon which may include both a time of departure and a recent CLMR. By scanning a medium, CToA client devices may detect CToA activity and estimate a broadcast periodicity of the bSTAs. Once the cSTA determines broadcast periodicity, the cSTA may hop between native channels used by the APs/bSTAs and may and collect CLMRs broadcast on the channels.

In one or more embodiments, the enhanced collaborative timing device 819 may contribute clock offsets and drift which may need to be estimated and accounted for. While one bSTA clock offset is being measured, other bSTA clock offsets may continue to drift apart. The clock offsets and drift may result in significant inaccuracies in ranging/positioning calculations. CToA calculations therefore may improve by accounting for clock offsets and drift. In addition, in a trigger-based IEEE 802.11ax scheme with a compressed time schedule, independent APs/bSTAs may broadcast independently, resulting in possible collisions and inability to process messages used for CToA calculations, for example. Such problems may result in difficulties for client devices roaming in and out of inter-AP (e.g., a single AP with multiple associated devices) and intra-AP (e.g., multiple APs operating on different frequency channels) environments. Also, in IEEE 802.11ax multi-user communications, a device may not be listening to a connection between other devices and may not receive and decode packets sent between those devices, which may limit a device's ability to collect data useful for CToA calculations.

In one or more embodiments, the enhanced collaborative timing device 819 may enable a combination of both managed and unmanaged scalable location protocols to enable the support of multiple use cases such as user navigation, asset tracking, analytics, and others. Client devices may enter and exit inter-AP and intra-AP environments managed by APs, and may benefit from receiving CToA data determined based on trigger-based uplink (UL) responses of devices associated with APs. By leveraging CToA data from different inter-AP and intra-AP environments, client devices may be able to estimate their positions as they move around venues where many client devices may be active.

In one or more embodiments, the enhanced collaborative timing device 819 may respond to trigger frames sent by an AP in a channel, and a client device may listen to and identify entire transactions between the AP and any AS in a cluster, and may identify a downlink (DL) NDP and a LMR sent by the AP to collect time of arrival and time of departure data useful in determining a device's position.

In one or more embodiments, the enhanced collaborative timing device 819 may use an IEEE 802.11 HEz-MU ranging message sequence. The entire ranging transaction may occur during a single TXOP, beginning with a trigger frame sent by an AP. A trigger frame may trigger an AS device to broadcast a UL frame (e.g., a NDP or other type of frame) a time after the trigger frame (e.g., short inter frame space of 16 us or another time). UL frames sent by AS devices may be received by an AP, and the AP may measure the respective times of arrival of any received UL frame. After receiving any number of UL transmissions (e.g., a UL transmission from each triggered AS device), the AP may send a DL frame (e.g., a NDPA) indicating the measured times of arrival for any UL transmissions of the AS devices. After another time (e.g., short inter frame space of 16 us or another time), the AP may send another DL frame (e.g., a NDP), and any AS device or other client device listening may receive the DL frame and measure its time of arrival.

In one or more embodiments, the enhanced collaborative timing device 819 may correct clock error and drift of AS devices, the CToA data may be more accurate. The length of a transmission opportunity (TXOP) may extend to ~1 ms. A crystal oscillator with ±1 PPM (parts per million) accuracy, may accumulate a clock offset error of ±1 ns (equivalent to ~±0.3 m ranging error) or ±25 ns (±8 m) for a typical 25 PPM crystal oscillator. Thus, a PPM offset estimated during a TXOP between an AS device and AP may be announced and/or corrected by one only of the sides (e.g., AP or AS). The enhanced CToA protocol may support several options: (1) The AP estimates the PPM offset of each AS and broadcasts the results in a PDU data frame after receiving respective UL frames including the AS LMRs to the AP. (2) Each AS estimates the PPM offset with respect to the AP and broadcasts the results in its PDU data frame broadcast. The AP then aggregates the reports from all the AS, and sends out their estimated PPM offsets in a data PDU. (3) Each AS estimates the PPM offset with respect to the AP and broadcasts the results in its PDU data frame broadcast. In such case, the optional AP LMR PDU at the end of the AS LMR broadcasts may not be needed. (4) The AP estimates the PPM offset of each AS and broadcasts the results in a dedicated PDU that follows the AS LMR broadcasts.

In one or more embodiments, the enhanced collaborative timing device 819 may report the clock PPM offsets of other devices. An information element indicating PPM offsets may include an indication of a medium access control (MAC) address of the managing AP (e.g., 48 bits), an indication of a MAC address of the AS device associated with the clock offset (e.g., 48 bits), the clock PPM offset measure (e.g., with an accuracy of 0.01 PPM or better, 32 bits), and a bit indicating which side estimated the offset (e.g., 0 for an AP, 1 for an AS, 1 bit).

In one or more embodiments, the enhanced collaborative timing device 819 may benefit from a managed nature of a cluster to estimate user locations while minimizing power consumption. In between clusters, a user may continue to navigate a venue with the help of a CToA protocol that may support an unmanaged multi-channel operation. Because client devices may move through both managed and unmanaged environments, enhanced CToA may allow client devices to leverage managed cluster environments controlled by APs by listening for and receiving time of arrival and departure data which client devices may use to estimate device positioning even while moving between different locations and types of environments.

In one or more embodiments, the enhanced collaborative timing device 819 may direct individual devices (e.g., AS devices) to send an uplink frame (e.g., a NDP). To trigger UL transmissions from multiple devices, an AP may send individual trigger frames (e.g., one per device with an AP resource allocation). When an AS device identifies a trigger frame addressed to the AS device, other AS devices and/or passive client devices may listen for and identify a UL NDP (or other UL transmission) sent by the triggered AS device, and any listening device may measure the time of arrival of the UL transmission.

In one or more embodiments, the enhanced collaborative timing device 819 may send UL frames be sent using MU frequency division multiplexing (FDM) or may be sent sequentially using time division multiplexing (TDM). In the MU case, a channel may be subdivided between AS devices according to an AP-provided allocation (e.g., which may occur prior to the CToA sequence, meaning prior to the trigger frame used to trigger a UL transmission for CToA). Passive client devices listening to this part of the sequence may be unable to decode a triggered LMR sent by an AS device because the MU resource allocation for the sending AS device may be unknown to them, along with channel state information between the AP and the individual transmitting AS device. Thus, the AP in that case may decode and repack the UL LMR and broadcast the LMR data at the end of the sequence (e.g., along with clock correction information). A broadcast (e.g., the DL LMR) may be executed at the lowest modulation and coding scheme (MCS) to enable a wide range of STA types to decode the broadcast. In the TDM case, any AS device may receive an allocation of a timeslot from an AP, and may use the timeslot to send an LMR. A cluster of devices may be formed statically by associated an AP with AS devices nearby. The device association phase may occur according to the IEEE 802.11 standards, and may be followed by a resource allocation/negotiation phase which may result in time, frequency, and/or other resources allocated to AS devices by an associated AP.

In one or more embodiments, the enhanced collaborative timing device 819 may log time of arrival and departure information of transmissions based on their transmission and receipt times. For example, a client device may log a transmitter AS identifier, a transmitter medium access control (MAC) address, a time of departure of a transmission, a receiver AS identifier, a receiver MAC address, and a time of arrival of a transmission. For a transmitted packet, the transmitter AS identifier, the packet time of departure, and the transmitter MAC address may be logged by the transmitting device. For a received packet, a packet identifier (PID), a time of arrival of the packet, a transmitter MAC, and transmitter AS identifier, a receiver MAC address, and a receiver AS identifier may be logged by a device receiving a packet.

In one or more embodiments, the enhanced collaborative timing device 819 may receive location services through the enhanced CToA scheme. The enhanced CToA scheme enables an unmanaged operation of an-AP/CToA bSTA-based network. Any AP/bSTA may announce an unavailability to its associated or unassociated STAs in a BSS (e.g., by issuing a "CTS-to-Self" frame or another type of frame). During the unavailability period, the AP/bSTA may "hop" through a list of channels in which neighbor bSTA/APs operate. Such a list of channels may be obtained through an AP scanning process. On any channel, the bSTA/AP may broadcast a CToA beacon, which may include an NDPA frame containing an information element with any previous timing measurements (e.g., times of arrival of broadcasts sent by other bSTAs, and times of departure of the AP/bSTA's own broadcasts). CToA cSTAs may listen to a channel for a period, which may be relative to a CToA beacon broadcasting rate, and may receive any timing information necessary to estimate its own cSTA device location. For network-centric applications (e.g., such as asset tracking, user-data analytics etc.) and/or a combination of legacy network transmissions with CToA broadcasts for client location, an unmanaged CToA scheme may be assumed.

It is understood that the above are only a subset of what the enhanced collaborative timing device 819 may be configured to perform and that other functions included throughout this disclosure may also be performed by the enhanced collaborative timing device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may be a device comprising memory and processing circuitry configured to: cause to send one or more trigger frames; identify one or more NDPs received from respective AS devices, wherein the one or more NDPs comprise a first NDP received from a first AS device of the respective AS devices at a first time and a second NDP received from a second AS device of the respective AS devices at a second time; cause to send a first NDPA, the first NDPA indicating the first time and the second time; cause to send a third NDP; identify one or more uplink NDPAs received from the respective AS devices, the one or more uplink NDPAs comprising a second NDPA received from the first AS device and a third NDPA received from the second AS device, wherein the second NDPA indicates a first time of arrival of the third NDP at the first AS device and a second time of arrival of the second NDP at the first AS device, and wherein the third NDPA indicates a third time of arrival of the third NDP at the second AS device and a fourth time of arrival of the first NDP at the second AS device; and cause to send a LMR PDU, the LMR PDU indicating the first time of arrival, the second time of arrival, the third time of arrival, and the fourth time of arrival.

Example 2 may include the device of example 1 and/or some other example herein, wherein the processing circuitry is further configured to determine one or more clock offsets associated with the respective anchor station devices, the one or more clock offsets comprising a first clock offset associated with the first anchor station device and a second clock offset associated with the second anchor station device, wherein the LMR PDU further indicates the one or more clock offsets.

Example 3 may include the device of example 1 and/or some other example herein, wherein the first NDP is received using a first frequency, wherein the second NDP is received using a second frequency, wherein the first frequency is different than the first frequency.

Example 4 may include the device of example 1 and/or some other example herein, wherein the first time is associated with a first time slot, wherein the second time is associated with a second time slot, wherein the first time slot and the second time slot overlap.

Example 5 may include the device of example 1 and/or some other example herein, wherein the one or more trigger frames comprise a first trigger frame and a second trigger frame, wherein the first trigger frame indicates that only the first anchor station device may send the first NDP, wherein the second trigger frame indicates that only the second anchor station device may send the second NDP.

Example 6 may include the device of example 1 and/or some other example herein, wherein the device is a first AP, wherein the respective AS devices are first respective AS devices, wherein the processing circuitry is further configured to: cause to send a CTS frame to the first respective AS devices, the CTS frame indicating that the device will be unavailable for a period of time; cause to send a fourth NDPA to second respective AS devices, wherein the second respective AS devices are associated with a second AP, wherein the fourth NDPA indicates the first time and the second time; and cause to send a fourth NDP to the second respective AS devices.

Example 7 may include the device of example 1 and/or some other example herein, further comprising a transceiver configured to transmit and receive wireless signals.

Example 8 may include the device of example 7 and/or some other example herein, further comprising one or more antennas coupled to the transceiver.

Example 9 may include a non-transitory computer-readable medium storing computer-executable instructions which when executed by one or more processors result in performing operations comprising: causing to send, by a device, one or more trigger frames; identifying one or more NDPs received from respective AS devices, wherein the one or more NDPs comprise a first NDP received from a first AS device of the respective AS devices at a first time and a second NDP received from a second AS device of the respective AS devices at a second time; causing to send a NDPA, the NDPA indicating the first time and the second time; causing to send a third NDP; and identifying one or more LMR PDUs received from the respective AS devices, the one or more LMR PDUs comprising a first LMR PDU received from the first AS device and a second LMR PDU received from the second AS device, wherein the first LMR PDU indicates a first time of arrival of the third NDP at the first AS device and a second time of arrival of the second NDP at the first AS device, and wherein the second LMR PDU indicates a third time of arrival of the third NDP at the second AS device and a fourth time of arrival of the first NDP at the second AS device.

Example 10 may include the non-transitory computer-readable medium of example 9 and/or some other example herein, wherein the first LMR PDU indicates a first clock offset associated with the first AS device, wherein the second LMR PDU indicates a second clock offset associated with the second AS device, wherein the first clock offset and the second clock offset are based on the third NDP.

Example 11 may include the non-transitory computer-readable medium of example 10 and/or some other example herein, the operations further comprising causing to send a third LMR PDU indicating the first clock offset and the second clock offset.

Example 12 may include the non-transitory computer-readable medium of example 9 and/or some other example herein, the operations further comprising: determining, based on the first LMR PDU, a first clock offset associated with the first AS device; determining, based on the second LMR PDU, a second clock offset associated with the second AS device; and causing to send a third LMR PDU indicating the first clock offset and the second clock offset.

Example 13 may include the non-transitory computer-readable medium of example 9 and/or some other example herein, wherein the first LMR PDU is received at a first time, wherein the second LMR PDU is received at a second time, wherein the first time and the second time do not overlap.

Example 14 may include the non-transitory computer-readable medium of example 9 and/or some other example herein, wherein the first LMR PDU and the second LMR PDU are received using a same frequency.

Example 15 may include the non-transitory computer-readable medium of example 9 and/or some other example herein, wherein the one or more trigger frames comprise a first trigger frame and a second trigger frame, wherein the first trigger frame indicates that only the first AS device may send the first NDP, wherein the second trigger frame indicates that only the second AS device may send the second NDP Example 16 may include the non-transitory computer-readable medium of example 9 and/or some other example herein, wherein the device is a first AP, wherein the respective AS devices are first respective AS devices, the operations further comprising: causing to send a frame to the first respective AS devices, the frame indicating that the device will be unavailable for a period of time; causing to send a second NDPA to second respective AS devices, wherein the second respective AS devices are associated with a second AP, wherein the second NDPA indicates the first time and the second time; and causing to send a fourth NDP to the second respective AS devices.

Example 17 may include a method comprising: identifying, by processing circuitry of a first AP, one or more uplink frames received from first respective AS devices, wherein the one or more uplink frames comprise a first uplink frame received from a first AS device of the first respective AS devices at a first time and a second uplink frame received from a second AS device of the first respective AS devices at a second time; causing to send, by the processing circuitry, a frame to the first respective AS devices, the frame indicating that the first AP will be unavailable for a period of time; causing to send, by the processing circuitry, a NDPA to second respective AS devices, wherein the second respective AS devices are associated with a second AP, wherein the NDPA indicates the first time and the second time; and causing to send a NDP to the second respective AS devices.

Example 18 may include the method of example 17 and/or some other example herein, wherein the NDP is a first NDP, wherein the first uplink frame is a second NDP received at a first time using a frequency, wherein the second uplink frame is a second NDP received at a second time using the frequency, wherein the first time does not overlap with the second time.

Example 19 may include the method of example 17 and/or some other example herein, wherein the NDPA is a first NDPA, wherein the first uplink frame is a second NDPA received using a first frequency, wherein the second uplink frame is a second NDPA using a second frequency, wherein the first frequency is different than the second frequency.

Example, 20 may include the method of example 17 and/or some other example herein, wherein the NDPA is a first NDPA, wherein the NDP is a first NDP, further comprising: causing to send a second NDPA to the first respective AS devices, the second NDPA indicating the first time and the second time; and causing to send a second NDP to the first respective AS devices.

Example 21 may include an apparatus comprising means for: causing to send one or more trigger frames; identifying one or more NDPs received from respective AS devices, wherein the one or more NDPs comprise a first NDP received from a first AS device of the respective AS devices at a first time and a second NDP received from a second AS device of the respective AS devices at a second time; causing to send a NDPA, the NDPA indicating the first time and the second time; causing to send a third NDP; and identifying one or more LMR PDUs received from the respective AS devices, the one or more LMR PDUs comprising a first LMR PDU received from the first AS device and a second LMR PDU received from the second AS device, wherein the first LMR PDU indicates a first time of arrival of the third NDP at the first AS device and a second time of arrival of the second NDP at the first AS device, and wherein the second LMR PDU indicates a third time of arrival of the third NDP at the second AS device and a fourth time of arrival of the first NDP at the second AS device.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments according to the invention are in particular disclosed in the attached claims directed to a method, a storage medium, a device and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising storage coupled to processing circuitry, the processing circuitry configured to:
   cause to send one or more trigger frames;
   identify one or more null data packets (NDPs) received from respective anchor station devices, wherein the one or more NDPs comprise a first NDP received from a first anchor station device of the respective anchor station devices at a first time and a second NDP received from a second anchor station device of the respective anchor station devices at a second time;
   cause to send a first null data packet announcement (NDPA), the first NDPA indicating the first time and the second time;
   cause to send a third NDP;
   identify one or more uplink NDPAs received from the respective anchor station devices, the one or more uplink NDPAs comprising a second NDPA received from the first anchor station device and a third NDPA received from the second anchor station device, wherein the second NDPA indicates a first time of arrival of the third NDP at the first anchor station device and a second time of arrival of the second NDP at the first anchor station device, and wherein the third NDPA indicates a third time of arrival of the third NDP at the second anchor station device and a fourth time of arrival of the first NDP at the second anchor station device; and
   cause to send a location measurement report (LMR) protocol data unit (PDU), the LMR PDU indicating the first time of arrival, the second time of arrival, the third time of arrival, and the fourth time of arrival.

2. The device of claim 1, wherein the processing circuitry is further configured to determine one or more clock offsets associated with the respective anchor station devices, the one or more clock offsets comprising a first clock offset associated with the first anchor station device and a second clock offset associated with the second anchor station device, wherein the LMR PDU further indicates the one or more clock offsets.

3. The device of claim 1, wherein the first NDP is received using a first frequency, wherein the second NDP is received using a second frequency, wherein the first frequency is different than the first frequency.

4. The device of claim 1, wherein the first time is associated with a first time slot, wherein the second time is associated with a second time slot, wherein the first time slot and the second time slot overlap.

5. The device of claim 1, wherein the one or more trigger frames comprise a first trigger frame and a second trigger frame, wherein the first trigger frame indicates that only the first anchor station device may send the first NDP, wherein the second trigger frame indicates that only the second anchor station device may send the second NDP.

6. The device of claim 1, wherein the device is a first access point, wherein the respective anchor station devices are first respective anchor station devices, wherein the processing circuitry is further configured to:
   cause to send a clear-to-send (CTS) frame to the first respective anchor station devices, the CTS frame indicating that the device will be unavailable for a period of time;
   cause to send a fourth NDPA to second respective anchor station devices, wherein the second respective anchor station devices are associated with a second access point, wherein the fourth NDPA indicates the first time and the second time; and
   cause to send a fourth NDP to the second respective anchor station devices.

7. The device of claim 1, further comprising a transceiver configured to transmit and receive wireless signals.

8. The device of claim 7, further comprising one or more antennas coupled to the transceiver.

9. A non-transitory computer-readable medium storing computer-executable instructions which when executed by one or more processors result in performing operations comprising:
- causing to send, by a device, one or more trigger frames;
- identifying one or more null data packets (NDPs) received from respective anchor station devices, wherein the one or more NDPs comprise a first NDP received from a first anchor station device of the respective anchor station devices at a first time and a second NDP received from a second anchor station device of the respective anchor station devices at a second time;
- causing to send a null data packet announcement (NDPA), the NDPA indicating the first time and the second time;
- causing to send a third NDP; and
- identifying one or more location measurement report (LMR) protocol data units (PDUs) received from the respective anchor station devices, the one or more LMR PDUs comprising a first LMR PDU received from the first anchor station device and a second LMR PDU received from the second anchor station device, wherein the first LMR PDU indicates a first time of arrival of the third NDP at the first anchor station device and a second time of arrival of the second NDP at the first anchor station device, and wherein the second LMR PDU indicates a third time of arrival of the third NDP at the second anchor station device and a fourth time of arrival of the first NDP at the second anchor station device.

10. The non-transitory computer-readable medium of claim 9, wherein the first LMR PDU indicates a first clock offset associated with the first anchor station device, wherein the second LMR PDU indicates a second clock offset associated with the second anchor station device, wherein the first clock offset and the second clock offset are based on the third NDP.

11. The non-transitory computer-readable medium of claim 10, the operations further comprising causing to send a third LMR PDU indicating the first clock offset and the second clock offset.

12. The non-transitory computer-readable medium of claim 9, the operations further comprising:
- determining, based on the first LMR PDU, a first clock offset associated with the first anchor station device;
- determining, based on the second LMR PDU, a second clock offset associated with the second anchor station device; and
- causing to send a third LMR PDU indicating the first clock offset and the second clock offset.

13. The non-transitory computer-readable medium of claim 9, wherein the first LMR PDU is received at a first time, wherein the second LMR PDU is received at a second time, wherein the first time and the second time do not overlap.

14. The non-transitory computer-readable medium of claim 9, wherein the first LMR PDU and the second LMR PDU are received using a same frequency.

15. The non-transitory computer-readable medium of claim 9, wherein the one or more trigger frames comprise a first trigger frame and a second trigger frame, wherein the first trigger frame indicates that only the first anchor station device may send the first NDP, wherein the second trigger frame indicates that only the second anchor station device may send the second NDP.

16. The non-transitory computer-readable medium of claim 9, wherein the device is a first access point, wherein the respective anchor station devices are first respective anchor station devices, the operations further comprising:
- causing to send a frame to the first respective anchor station devices, the frame indicating that the device will be unavailable for a period of time;
- causing to send a second NDPA to second respective anchor station devices, wherein the second respective anchor station devices are associated with a second access point, wherein the second NDPA indicates the first time and the second time; and
- causing to send a fourth NDP to the second respective anchor station devices.

17. A method, comprising:
- causing to send, by processing circuitry of an access point, one or more trigger frames;
- identifying, by the processing circuitry, one or more null data packets (NDPs) received from respective anchor station devices, wherein the one or more NDPs comprise a first NDP received from a first anchor station device of the respective anchor station devices at a first time and a second NDP received from a second anchor station device of the respective anchor station devices at a second time;
- causing to send, by the processing circuitry, a first null data packet announcement (NDPA), the first NDPA indicating the first time and the second time;
- causing to send, by the processing circuitry, a third NDP;
- identifying, by the processing circuitry, one or more uplink NDPAs received from the respective anchor station devices, the one or more uplink NDPAs comprising a second NDPA received from the first anchor station device and a third NDPA received from the second anchor station device, wherein the second NDPA indicates a first time of arrival of the third NDP at the first anchor station device and a second time of arrival of the second NDP at the first anchor station device, and wherein the third NDPA indicates a third time of arrival of the third NDP at the second anchor station device and a fourth time of arrival of the first NDP at the second anchor station device; and
- causing to send, by the processing circuitry, a location measurement report (LMR) protocol data unit (PDU), the LMR PDU indicating the first time of arrival, the second time of arrival, the third time of arrival, and the fourth time of arrival.

18. The method of claim 17, further comprising determining one or more clock offsets associated with the respective anchor station devices, the one or more clock offsets comprising a first clock offset associated with the first anchor station device and a second clock offset associated with the second anchor station device, wherein the LMR PDU further indicates the one or more clock offsets.

19. The method of claim 17, wherein the first NDP is received using a first frequency, wherein the second NDP is received using a second frequency, wherein the first frequency is different than the first frequency.

20. The method of claim 17, wherein the first time is associated with a first time slot, wherein the second time is associated with a second time slot, wherein the first time slot and the second time slot overlap.

* * * * *